United States Patent
Reitz et al.

(10) Patent No.: US 9,417,345 B2
(45) Date of Patent: Aug. 16, 2016

(54) METHOD FOR CALIBRATING A COUNTING DIGITAL X-RAY DETECTOR, X-RAY SYSTEM FOR PERFORMING SUCH A METHOD AND METHOD FOR ACQUIRING AN X-RAY IMAGE

(71) Applicants: Silke Reitz, Forchheim (DE); Martin Spahn, Erlangen (DE)

(72) Inventors: Silke Reitz, Forchheim (DE); Martin Spahn, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 247 days.

(21) Appl. No.: 14/146,564

(22) Filed: Jan. 2, 2014

(65) Prior Publication Data
US 2014/0185781 A1    Jul. 3, 2014

(30) Foreign Application Priority Data
Jan. 2, 2013   (DE) .......................... 10 2013 200 021

(51) Int. Cl.
*G01T 7/00* (2006.01)
*G01T 1/24* (2006.01)

(52) U.S. Cl.
CPC ................. *G01T 7/005* (2013.01); *G01T 1/247* (2013.01)

(58) Field of Classification Search
USPC ....................................... 378/207; 250/252.1
See application file for complete search history.

(56) References Cited

U.S. PATENT DOCUMENTS

| | | |
|---|---|---|
| 2008/0048126 A1 | 2/2008 | Janssen et al. |
| 2011/0012014 A1 | 1/2011 | Livne et al. |
| 2013/0214144 A1 | 8/2013 | Hannemann et al. |
| 2014/0105370 A1* | 4/2014 | Yamakawa et al. .... A61B 6/025 378/207 |

FOREIGN PATENT DOCUMENTS

| | | |
|---|---|---|
| DE | 102006022596 | 11/2007 |
| DE | 102011080656 | 2/2013 |

OTHER PUBLICATIONS

German Office Action dated Oct. 4, 2013 in corresponding German Patent Application No. DE 10 2013 200 021.9 with English translation.
Martin Spahn, "Flat Detectors and their Clinical Applications", Eur Radiol., Apr. 2, 2005, pp. 1934-1947, vol. 15.

* cited by examiner

*Primary Examiner* — Kiet T Nguyen
(74) *Attorney, Agent, or Firm* — Lempia Summerfield Katz LLC

(57) ABSTRACT

A method for calibrating a counting digital X-ray detector includes performing a threshold value scan in at least one defined X-ray spectrum for irradiating the X-ray detector, which includes a matrix composed of pixel elements, storing count rates of the pixel elements as a function of respective applied threshold values, and from results of a measurement of count rates of the pixel elements, determining or calculating individual correction threshold values for the individual pixel elements. The individual correction threshold values correct a threshold value that is to be applied to the pixel elements for the defined X-ray spectrum such that threshold value noise is reduced.

18 Claims, 16 Drawing Sheets

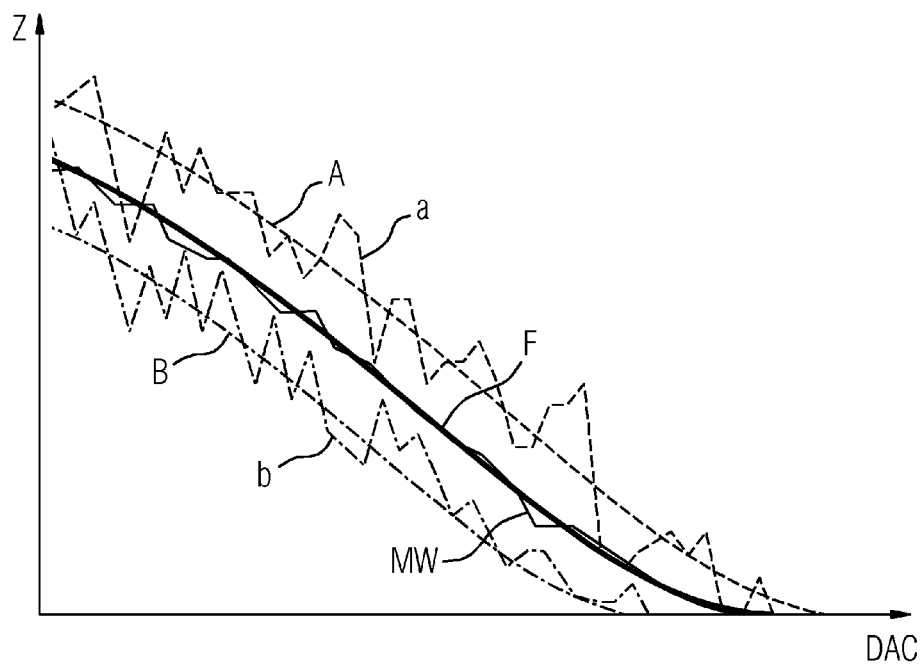
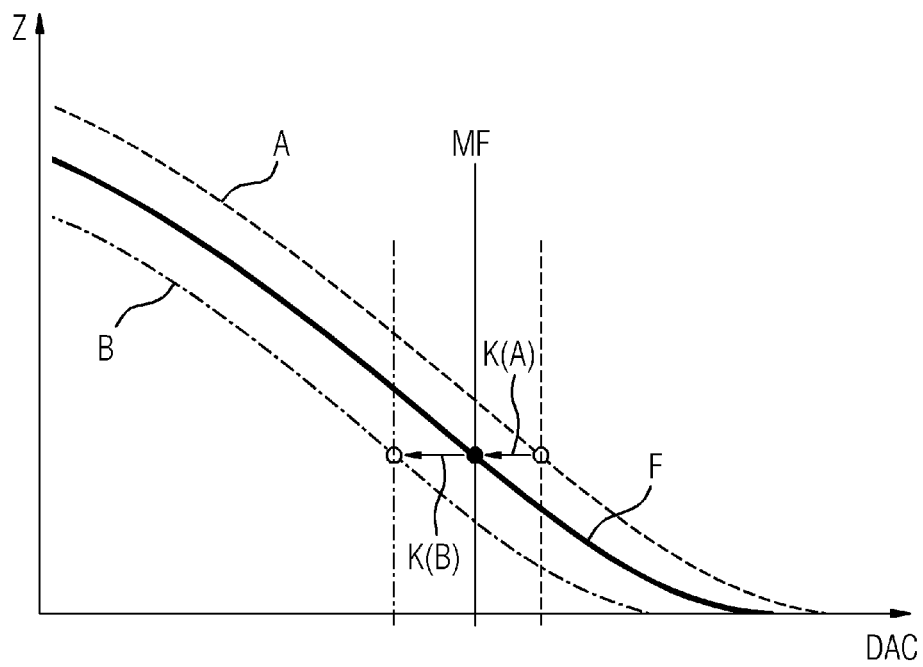

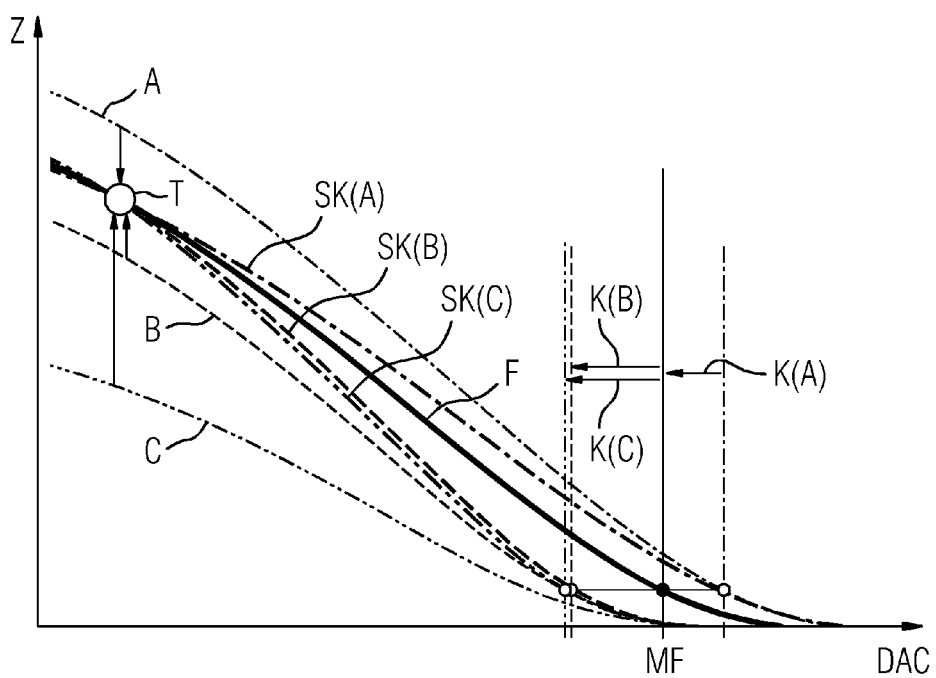
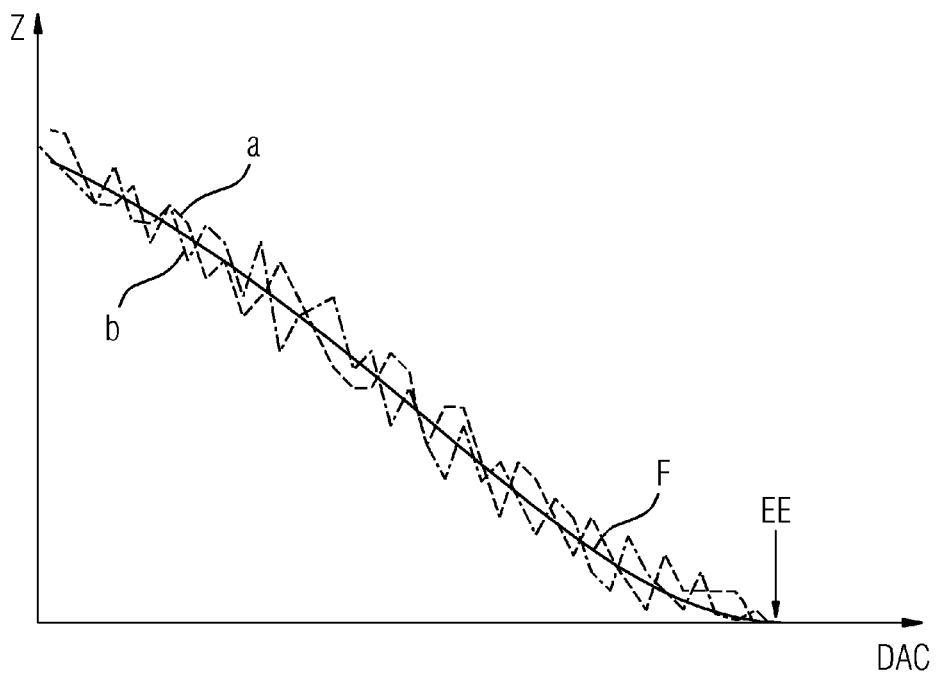

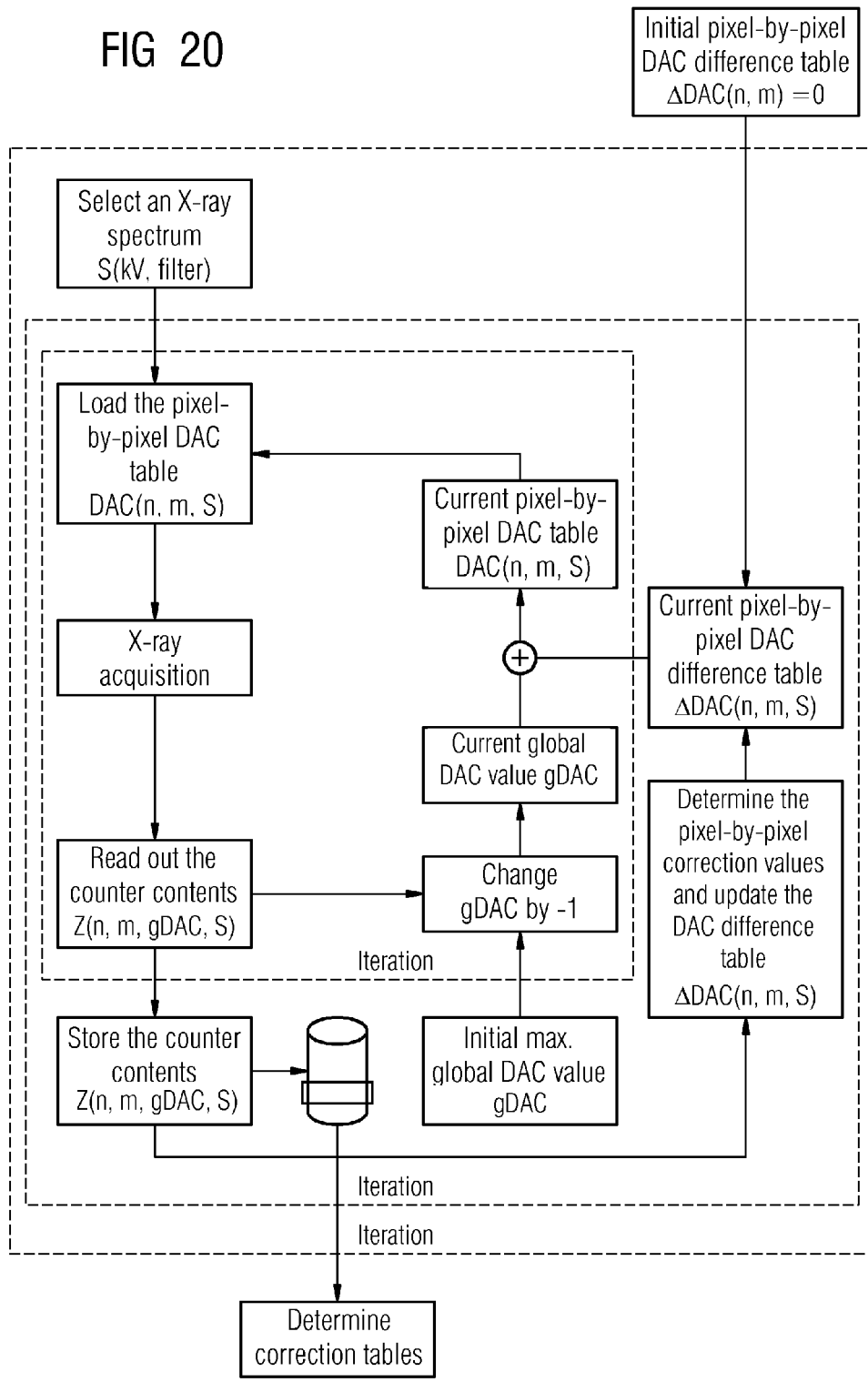

METHOD FOR CALIBRATING A COUNTING DIGITAL X-RAY DETECTOR, X-RAY SYSTEM FOR PERFORMING SUCH A METHOD AND METHOD FOR ACQUIRING AN X-RAY IMAGE

This application claims the benefit of DE 10 2013 200 021.9, filed on Jan. 2, 2013, which is hereby incorporated by reference in its entirety.

BACKGROUND

The present embodiments relate to calibrating a counting digital X-ray detector.

X-ray systems are used for imaging for diagnostic examination purposes and for interventional procedures (e.g., in cardiology, radiology and surgery). X-ray systems 16, as shown in FIG. 1, have an X-ray tube 18 and an X-ray detector 17 (e.g., jointly mounted on a C-arm 19), a high-voltage generator for generating the tube voltage, an imaging system 21 (e.g., including at least one monitor 22), a system control unit 20 and a patient table 23. Biplane systems (e.g., having two C-arms) are likewise employed in interventional radiology. Generally, flat-panel X-ray detectors find application as X-ray detectors in many fields of medical X-ray diagnostics and intervention (e.g., in radiography, interventional radiology, cardioangiography), but also in therapeutic treatment applications for imaging within the context of monitoring and irradiation planning or mammography.

Flat-panel X-ray detectors in use today may be integrating detectors and are based mainly on scintillators having light that is converted into electrical charge in photodiode arrays. The electrical charge is read out (e.g., row by row) via active control elements. FIG. 2 schematically shows the layout of a currently used indirectly converting flat-panel X-ray detector, having a scintillator 10, an active readout matrix 11 made of amorphous silicon with a plurality of pixel elements 12 (e.g., with photodiode 13 and switching element 14) and drive and readout electronics 15 (see, e.g., M. Spahn, "Flat detectors and their clinical applications," Eur Radiol. (2005), 15: 1934-1947). Depending on beam quality, the quantum efficiency for a CsI-based scintillator having a layer thickness of, for example, 600 mm lies between about 50% and 80% (see, e.g., M. Spahn, "Flat detectors and their clinical applications," Eur Radiol. (2005), 15: 1934-1947). By this, the spatial frequency dependent DQE(f) ("detective quantum efficiency") is upwardly limited, and for typical pixel sizes of, for example, 150 μm to 200 mm and for the spatial frequencies of 1 lp/mm to 2 lp/mm, of interest to the applications lies significantly below that. In order to enable new applications (e.g., dual-energy, material separation), but also to increase quantum efficiency further, the potential of counting detectors or of energy-discriminating counting detectors mainly based on direct-converting materials (e.g., CdTe or CdZTe=CZT) and contacted application-specific integrated circuits (ASICs) (e.g., implemented in CMOS technology) is being investigated to an increasing extent.

An exemplary design of such counting detectors is shown in FIG. 3. X-ray radiation is converted in the direct converter 24 (e.g., CdTe or CZT), and the charge carrier pairs generated are separated by way of an electrical field generated by a common top electrode 26 and a pixel electrode 25. The charge generates a charge pulse in one of the pixel-shaped pixel electrodes 26 of the ASIC 27. The charge pulse corresponds in height to the energy of the X-ray quantum and, if lying above a defined threshold value, is registered as a count event. The threshold value serves to differentiate an actual event from electronic noise or, for example, also to suppress k-fluorescence photons in order to avoid multiple counts. The ASIC 27, a corresponding section of the direct converter 24 and a coupling between direct converter 24 and ASIC 27 (e.g., using bump bonds 36 in the case of direct-converting detectors) in each case form the detector module 35 having a plurality of pixel elements 12. The ASIC 27 is arranged on a substrate 37 and connected to peripheral electronics 38. A detector module may also have one or more ASICs and one or more subsections of a direct converter, chosen as requirements dictate in each case.

The general layout of a counting pixel element 12 is shown schematically in FIG. 5. The electrical charge is collected via the charge input 28 in the pixel element and amplified there with the aid of a charge amplifier 29 and a feedback capacitor 40. In addition, the pulse shape may be adjusted in a shaper (e.g., filter) at the output (not shown). An event is counted such that a digital memory unit 33 (e.g., counter) is incremented by one if the output signal is above a selectable threshold value. This is verified via a discriminator 31. In principle, the threshold value may also be permanently predefined by an analog device, though generally the threshold value is applied via a digital-to-analog converter (DAC) 32 and is thus variably adjustable within a certain range. The threshold value may either be set pixel by pixel locally, as shown, via the discriminator 31 (e.g., local discriminator) and ASIC 32 (e.g., local ASIC) or else globally for a plurality of/all pixel elements via, for example, a global discriminator and ASIC. The counter status of the digital memory unit 33 may be read out via a drive and readout unit 38. FIG. 6 shows a corresponding schematic layout for an entire array of counting pixel elements 12 (e.g., 100×100 pixel elements of 180 mm each and a drive and readout unit 38). In this example, the array would have a size of 1.8×1.8 cm². For large-area detectors (e.g., 20×30 cm²), as shown in FIG. 4, for example, a plurality of detector modules 35 are connected together (e.g., in this example, 11×17 would produce approximately the desired surface area) and detector modules 35 are connected via the common peripheral electronics, such as, for example, a drive and readout unit 38. Through silicon via (TSV) technology, indicated by the reference numeral 37 in FIG. 4, is used, for example, for realizing the connection between ASIC 27 and peripheral electronics in order to provide the modules are arranged side by side as tightly as possible in a four-sided array.

In the case of counting and energy-discriminating X-ray detectors, two, three (e.g., as shown in FIG. 7, with the reference numeral according to FIG. 5) or more threshold values are introduced, and the level of the charge pulse, corresponding to the predefined threshold values (e.g., discriminator threshold values), is classified into one or more of the digital memory units (e.g., counters). The X-ray quanta counted in a particular energy range may be obtained by forming the difference between the counter contents of two corresponding counters. The discriminators may be set, for example, with the aid of digital-to-analog converters either for the entire detector module or pixel by pixel within given limits or ranges. The counter contents of the pixel elements are read out module by module in succession via a corresponding readout unit. This readout process requires a certain amount of time during which it is not possible to continue counting without error.

Basically, various architectures are possible for implementing digital-to-analog converters (DAC). Two examples are described below.

1. Each pixel has a digital-to-analog converter with sufficiently fine analog graduation per bit and sufficiently high bit depth, so that both expected variations may be corrected, and the threshold value desired in each case (e.g., X-ray energy range) may be covered.

2. There is a "global" digital-to-analog converter per X-ray detector or per detector module (or just a few), which generates a common voltage (or current) for all pixel elements and thus makes provision for a global "rough threshold value". In each pixel, there is also an additional local digital-to-analog converter that generates a further pixel-internal common voltage (current) that in combination with the global voltage (current) generates a pixel-specific total voltage (total current).

In a design of the type, the increments of the energies for global digital-to-analog converters and local digital-to-analog converters may be configured either as equal in width (e.g., 1 keV/bit) or with different widths (e.g., rather more roughly for the global digital-to-analog converter and finer for the local digital-to-analog converters). In this case, the local digital-to-analog converters may have a sufficiently high bit depth in order to cover the rougher increments of the global digital-to-analog converter. As an example of the case described, the global digital-to-analog converter has an increment of 2 keV/bit (or corresponding voltage differences or current differences) with a 6-bit depth (e.g., values between 0 and 126 keV may be covered). Correspondingly, the local digital-to-analog converters have 0.5 keV/bit and, for example, a 5-bit depth configured to compensate for the local fluctuations of the global digital-to-analog converter at the pixel element in a range of 16 keV. The example presupposes a linear behavior of the global digital-to-analog converter and the local digital-to-analog converters, as otherwise a correspondingly more generously dimensioned design will be necessary. A favorable choice of bit depths and energy increments is dependent on pixel and module design, X-ray detector material properties (e.g., CdTe), the clinical applications, and other factors.

Counting detectors with adjustable discriminator threshold values exhibit problems such as the following. The discriminator threshold values may vary from pixel element to pixel element. However, since only X-ray quanta having X-ray energy that lies above the threshold values are counted, different portions of the energy spectrum are counted, resulting in "threshold value noise". This type of noise is a particular characteristic of counting and energy-discriminating counting detectors. The discriminator threshold values are modified via DAC values. These digital values are initially not assigned to certain physical energies. A calibration enabling an assignment of threshold values and energies in keV is therefore to be provided. The design of the X-ray detector may have different sizes of pixel elements (e.g., smaller effective pixel elements at the edges of detector modules compared with pixel elements that are arranged centrally on the detector module), such that differently high count rates are to be expected for geometric reasons. The detector material may also have detector material defects (e.g., Te inclusions, structure limits, field profiles or other). Such effects may lead to structural or "fixed pattern"-like noise. The radiation field, too, may not be homogeneous over the entire surface area of the X-ray detector, since an X-ray source may be punctiform, and therefore, the X-ray flux may vary depending on the distance separating tube focus and detector pixel. The heel effect may also lead to locally different radiation profiles due to direction-dependent reabsorption of the generated X-ray radiation in the tube anode on the X-ray detector.

SUMMARY AND DESCRIPTION

The scope of the present invention is defined solely by the appended claims and is not affected to any degree by the statements within this summary. The present embodiments may obviate one or more of the drawbacks or limitations in the related art. For example, a method that solves at least one of the above-described problems and enables X-ray imaging of higher quality is provided. As another example, an X-ray system that is suitable for performing the method and a method for acquiring an X-ray image using such an X-ray system are provided.

The method according to one or more of the present embodiments for, for example, automatic calibration of a counting digital X-ray detector including an X-ray converter for converting X-ray radiation into an electrical signal and a matrix composed of a plurality of counting pixel elements, is provided. Each pixel element has a signal input and at least one memory unit (e.g., a counter). For each pixel element, a threshold value above which the incoming signal is counted by a memory unit is applied. The method includes performing a threshold value scan for a defined X-ray spectrum for irradiating the X-ray detector. The performing of the threshold value scan includes applying a first threshold value that is the same for all pixel elements, irradiating the X-ray detector with X-ray radiation of the defined X-ray spectrum, and during the irradiation, measuring the count rates of the pixel elements of the X-ray detector. The performing of the threshold value scan also includes subsequently applying a further threshold value, different from the first, to all pixel elements and repeating the irradiating and the measuring. If necessary, the applying of the further threshold value is iterated one-time or multiple times. The method includes storing the count rates of the pixel elements as a function of the respective applied threshold values, and from the measurement results, determining or calculating individual correction threshold values for the individual pixel elements. The individual correction threshold values correct a threshold value that is to be applied to the pixel elements for the defined X-ray spectrum such that the threshold value noise is reduced (e.g., a count starting essentially at the same X-ray energy for all of the pixel elements being effected).

The count rate of the pixel elements is therefore measured, for example, in the case of X-ray irradiation with an X-ray spectrum of a commercially available X-ray source (e.g., max. 50, 70, 90 or 120 keV), while a first threshold value that is the same for all pixel elements is applied, for example, using discriminators and digital-to-analog converters. A further measurement is subsequently carried out at a further threshold value that is different from the first threshold value. It is of advantage if at least three or more measurements are performed at other threshold values. A plurality of measurements may also be carried out. For example, a series of different threshold values may be applied in ascending or descending order, and corresponding measurements may be taken. The measurement results are stored and used accordingly for determining and/or calculating individual correction threshold values that are to be used for planned measurements with the X-ray detector in addition to the originally identical threshold values for all of the pixel elements. The correction threshold values are selected such that for the defined X-ray spectrum that is the same for all pixel elements, all the pixel elements start with a count at essentially the same X-ray energy or differ from one another by only a small amount at least with respect to the start of the count.

A significant improvement in image quality during X-ray imaging and, for example, a reduction in threshold-value-induced noise may be achieved by the method according to one or more of the present embodiments. The method is a robust method that may also be reliably performed without monoenergetic (e.g., radioactive) X-ray sources, simply using typical X-ray spectra. As a result, the method may be performed without problems with any X-ray source. The method may easily be automated, thus enabling a recalibration to be performed quickly and reliably (e.g., in the case of drifts, temperature influences, etc).

An X-ray system for performing the method according to one or more of the present embodiments has a counting digital X-ray detector including an X-ray converter for converting X-ray radiation into an electrical signal, a matrix composed of a plurality of counting pixel elements, and a drive and readout unit. Each pixel element has a signal input, a counter and at least one local discriminator and at least one local digital-to-analog converter having a local threshold value (DDAC) that may be adjusted individually for the respective pixel element. For each pixel element above the threshold value, the incoming signal is counted by a memory unit. The X-ray system also includes an X-ray source for emitting X-ray radiation, a memory unit for storing the count rates of the pixel elements, and a calculation unit for determining or calculating the correction values. With an X-ray system or X-ray detector of the type, in which each pixel element has at least one local discriminator and at least one local digital-to-analog converter, the threshold value may be applied to the respective pixel element within the context of the threshold value scan using the local discriminators and the local digital-to-analog converters. For example, for the case where such an X-ray detector has exclusively local discriminators and local digital-to-analog converters, the threshold value is applied exclusively by these.

A further X-ray system for performing the method according to one or more of the present embodiments has a counting digital X-ray detector. The X-ray detector includes an X-ray converter for converting X-ray radiation into an electrical signal, a matrix composed of a plurality of counting pixel elements, a drive and readout unit, at least one global discriminator and one global digital-to-analog converter having an adjustable global threshold value (gDAC) that may be applied to all or a plurality of pixel elements. Each pixel element has a signal input, a counter and at least one local discriminator and at least one local digital-to-analog converter having a local threshold value (DDAC) that is individually adjustable for the respective pixel element. For each pixel element above the summated threshold value, the incoming signal is counted by a memory unit. The X-ray system also includes an X-ray source for emitting X-ray radiation, a memory unit for storing count rates of the pixel elements, and a calculation unit for determining or calculating the correction values. With an X-ray system or X-ray detector of this type, the threshold value may advantageously be applied as the sum of the global and the local threshold value. In the threshold value scans, the local threshold values are set to zero. There may be present (e.g., for the entire X-ray detector) only one global discriminator and one global digital-to-analog converter that may apply a global threshold value to all of the pixel elements simultaneously. A plurality of global discriminators and global digital-to-analog converters that may be used for a greater number of pixel elements (e.g., one per detector module in each case) may also be provided.

According to a further embodiment, the following acts are performed for calculating the correction threshold values: determining characteristic curves for the individual pixel elements by plotting the count rates against the threshold value, calculating an average value curve from the curves of the pixel elements, selecting a reference value on the average value curve, determining the horizontal difference between the reference value and the respective characteristic curve of the pixel elements, and determining the correction threshold values from the horizontal differences. This calculation represents a reliable possibility for obtaining correction threshold values from the recorded threshold value scans. In this case, the characteristic curves are determined from the previously measured data of the threshold value scans. An average value curve is determined or calculated, for example, by averaging the characteristic curves of a plurality or all of the pixel elements. The reference value may be specified at an arbitrary point on the average value curve. The reference value may advantageously be selected at between 5% and 25% (e.g., 10% or 20%) of the maximum count rate. Other reference values may also be provided, however. The horizontal difference between the reference value and the respective characteristic curve of the pixel elements is determined in order to calculate therefrom the correction threshold value for the corresponding pixel element. In this case, for example, the correction threshold value may correspond to the horizontal difference or be calculated from the horizontal difference using addition of a constant amount (e.g., in order not to obtain negative values, since no "negative" threshold values may be applied).

According to an embodiment, the characteristic curves and/or the average value curves are fitted and/or smoothed and/or scaled. In this way, it is easier to determine or calculate the correction threshold values, statistical variations may be reduced, and the calibration may be improved. It may, for example, be provided initially to smooth the characteristic curves and adapt a suitable fit function to the individual characteristic curves. An average value curve is determined, for example, from the smoothed and fitted functions. The horizontal differences are likewise calculated, for example, based on the smoothed and fitted functions.

According to a further embodiment, the performing of the threshold value scan, the storing of the count rates, and the determining or calculating of the individual correction threshold values are repeated. The individual correction threshold values are used in the threshold value scans instead of the same threshold values for all of the pixel elements. Thereby, updated correction threshold values are determined in the determining or calculating of the individual correction threshold values. For example, the method is iterated multiple times. The individual, current correction threshold values determined in the preceding iteration are used in each case in the threshold value scans. The iterations provide that the pixel elements increasingly approach one another with respect to the start of a count (e.g., at the corresponding X-ray energy) or increasingly approach the average value curve until all the pixel elements have an (almost) identical count start.

For the case where the corresponding X-ray detector is able to generate both global and local threshold values, the correction threshold values are, according to one embodiment, applied to the individual pixel elements as local threshold values.

During the determination of the correction threshold values, the different increments of the global and local digital-to-analog converters and/or non-linear behavior with respect to one another are advantageously taken into account through use of conversion factors. If a linear relationship is present, constants may be used. Otherwise, a more complex function may also be used.

According to a further embodiment, a table is generated from the correction threshold values and stored. In this case, the correction threshold values may be taken from the table and adjusted for the pixel elements of the X-ray detector.

Initially, correction threshold values determined for the respective X-ray spectrum used are now present. In order to make the calibration more comprehensively applicable to a plurality of or even to all possible X-ray spectra and X-ray energies, the following acts are advantageously performed: the performing of the threshold values scan and the storing of the count rates are performed for at least two X-ray spectra, characteristic lines are generated from the measurements for the at least two X-ray spectra (e.g., using a fit function), for the pixel elements by plotting the maximum energy of the X-ray spectra against the threshold value at which the respective pixel element starts to count, an average value curve is determined from the characteristic lines of the pixel elements, and the characteristic lines are used for determining or calculating individual correction threshold values for the individual pixel elements. Correction threshold values are determined for a plurality of X-ray energies. Using this link between the energy of the X-ray spectra and the threshold values, and advantageously also using a fit function that connects the discrete points of the actually measured X-ray spectra, the corresponding correction threshold values may be derived for each pixel element and for each desired X-ray spectrum or each X-ray energy from the characteristic lines and, for example, to input the values into the X-ray detector. Accordingly, the method is able, using normal X-ray sources, to generate an absolute relationship between threshold value and energy.

According to a further embodiment, for the case where only discrete values may be selected for the threshold values, and the determined correction threshold values deviate from the selectable discrete values, the discrete values closest to the correction threshold values are used in each case.

In one or more of the present embodiments, a method for acquiring at least one X-ray image using an X-ray system is provided. Correction threshold values determined by a method according to one or more of the present embodiments are used during the acquisition of X-ray images for the purpose of correcting the threshold value noise. Such a method achieves X-ray images that are almost or completely free of threshold value noise and therefore exhibit a particularly high image quality.

BRIEF DESCRIPTION OF THE DRAWINGS

FIG. 8 shows characteristic curves of the count rate of two pixel elements a and b and a corresponding average value curve plotted against a global threshold value prior to use of one embodiment of the calibration method;

FIG. 9 shows characteristic curves according to FIG. 8 and associated fitted characteristic curves as well as a reference value and the horizontal differences between the characteristic curves of the two pixel elements;

FIG. 10 shows fitted characteristic curves of three pixel elements a, b and c prior to use of one embodiment of the calibration method;

FIG. 11 shows characteristic curves of the count rate of two pixel elements a and b and a corresponding average value curve plotted against a global threshold value after use of one embodiment of the calibration method;

FIG. 20 shows a sequence of one embodiment of a calibration method.

DETAILED DESCRIPTION

Figure 1:
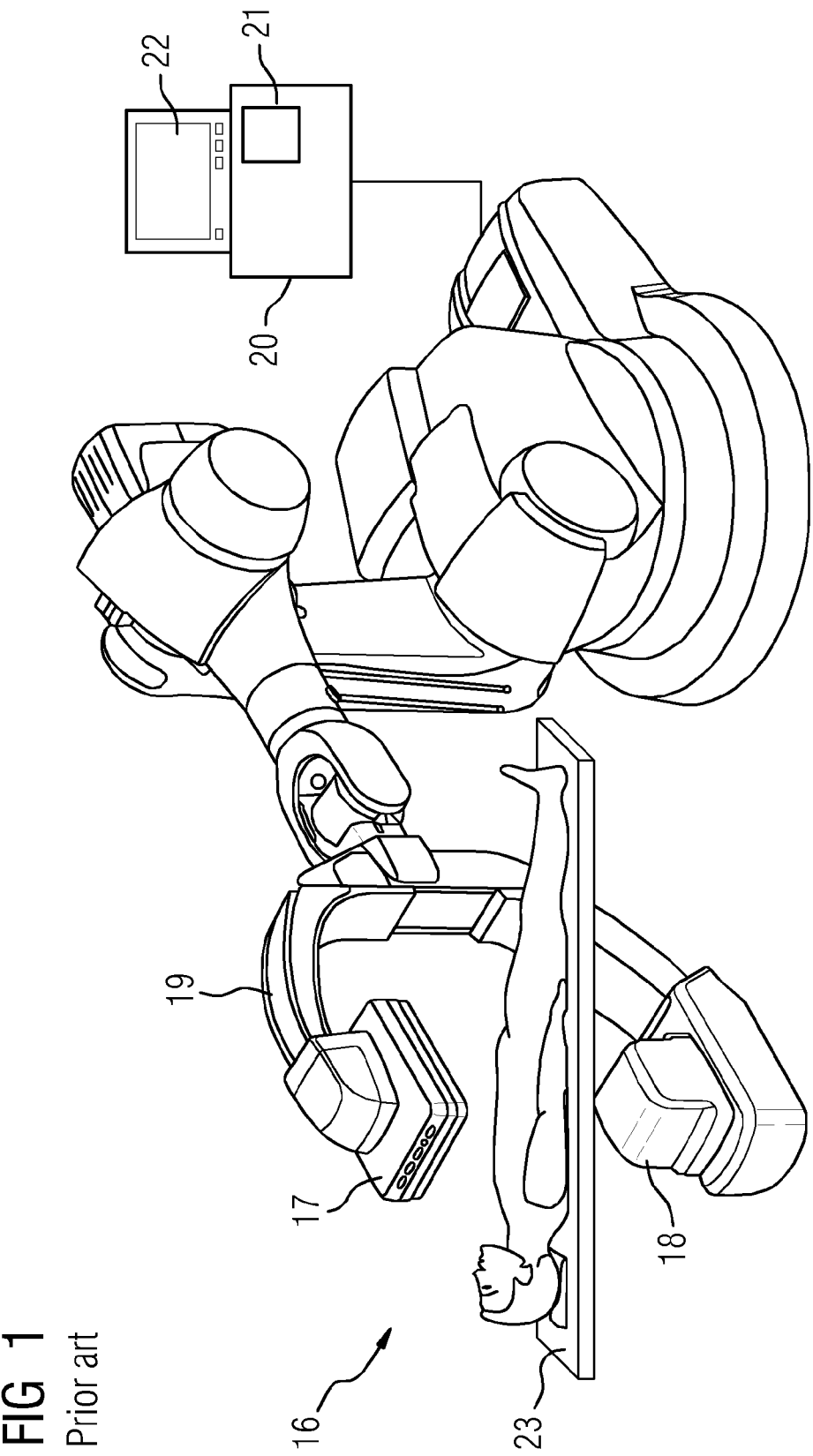
FIG. 1 shows a known X-ray system for use in interventional procedures.
Figure 2:
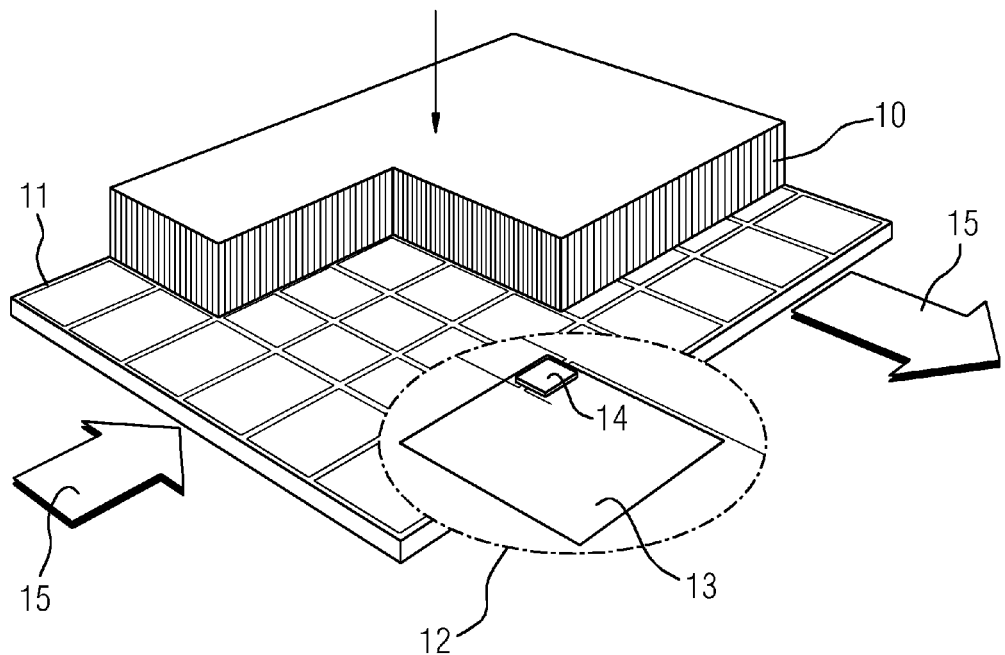
FIG. 2 shows a known X-ray detector having a scintillator.
Figure 3:
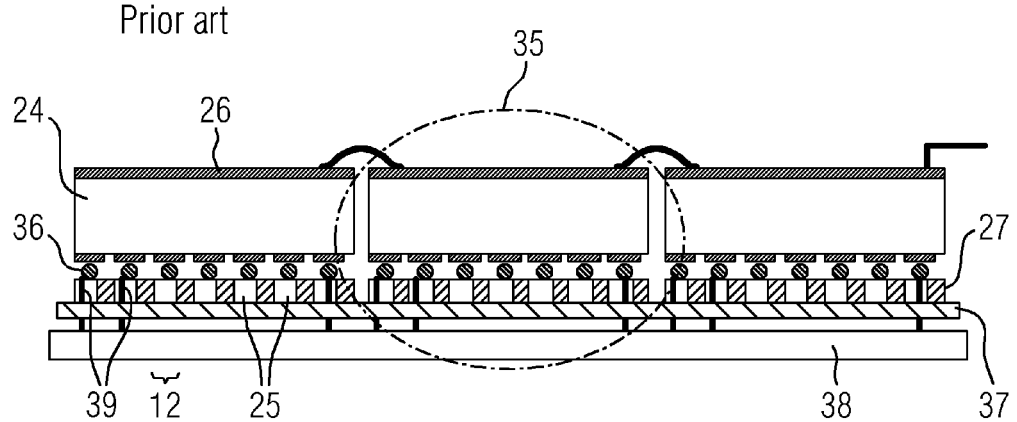
FIG. 3 shows a section through a detail from a known X-ray detector having a plurality of detector modules.
Figure 4:
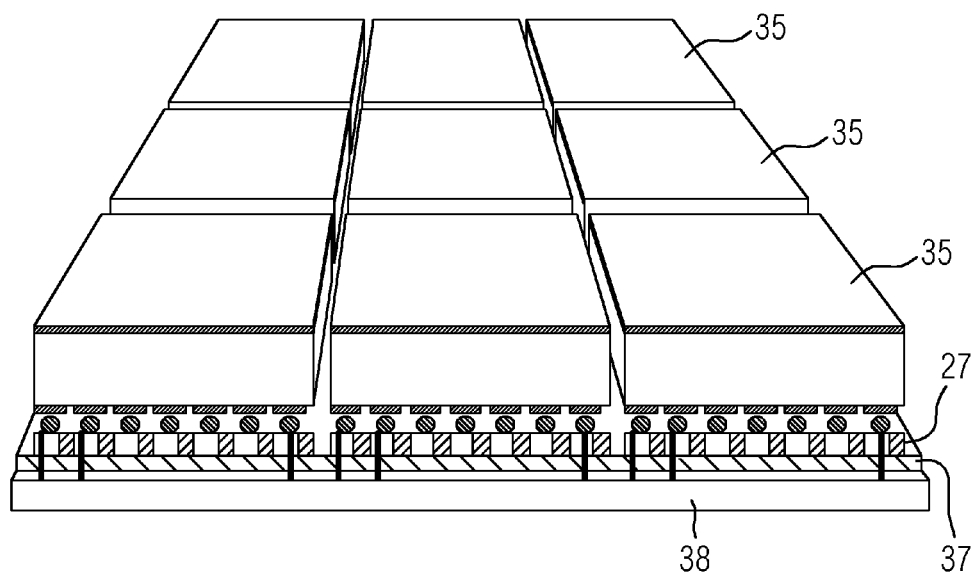
FIG. 4 shows a perspective plan view onto a section through a detail from a known X-ray detector having a plurality of detector modules.
Figure 5:
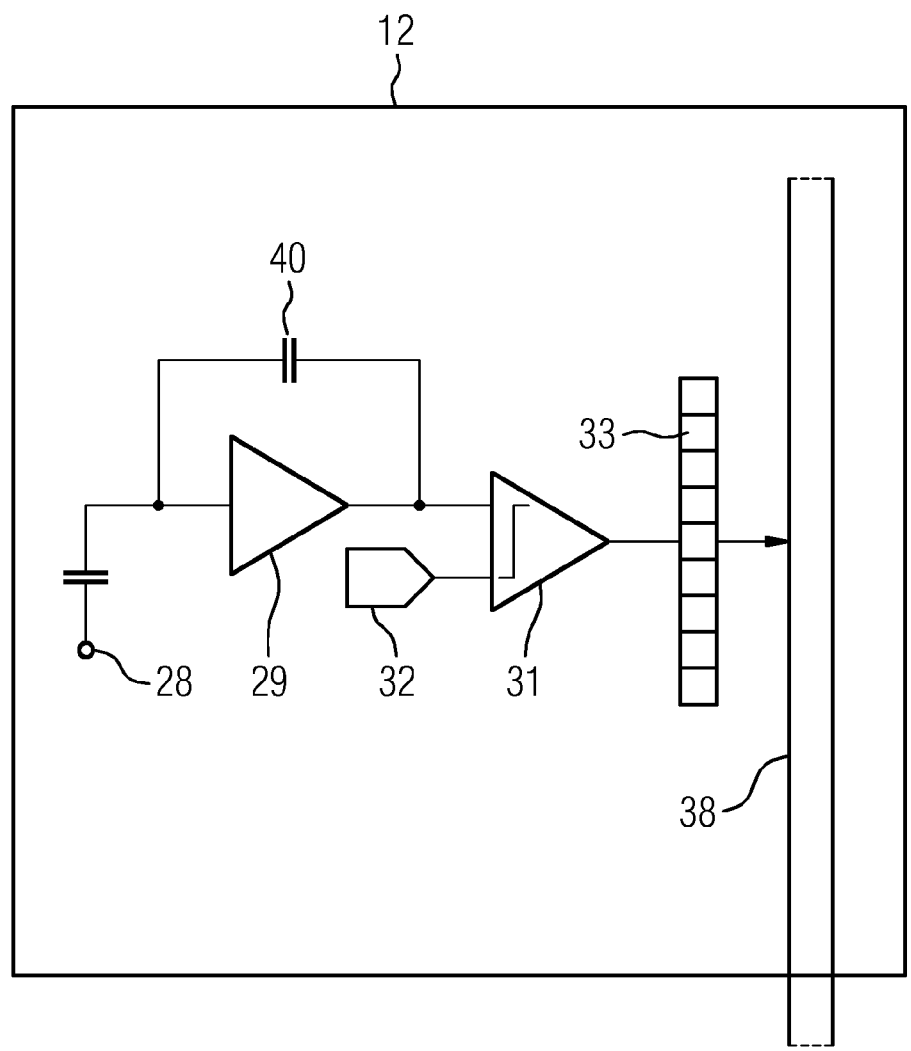
FIG. 5 is a schematic representation of central functional elements of a counting pixel element of a known X-ray detector.
Figure 6:
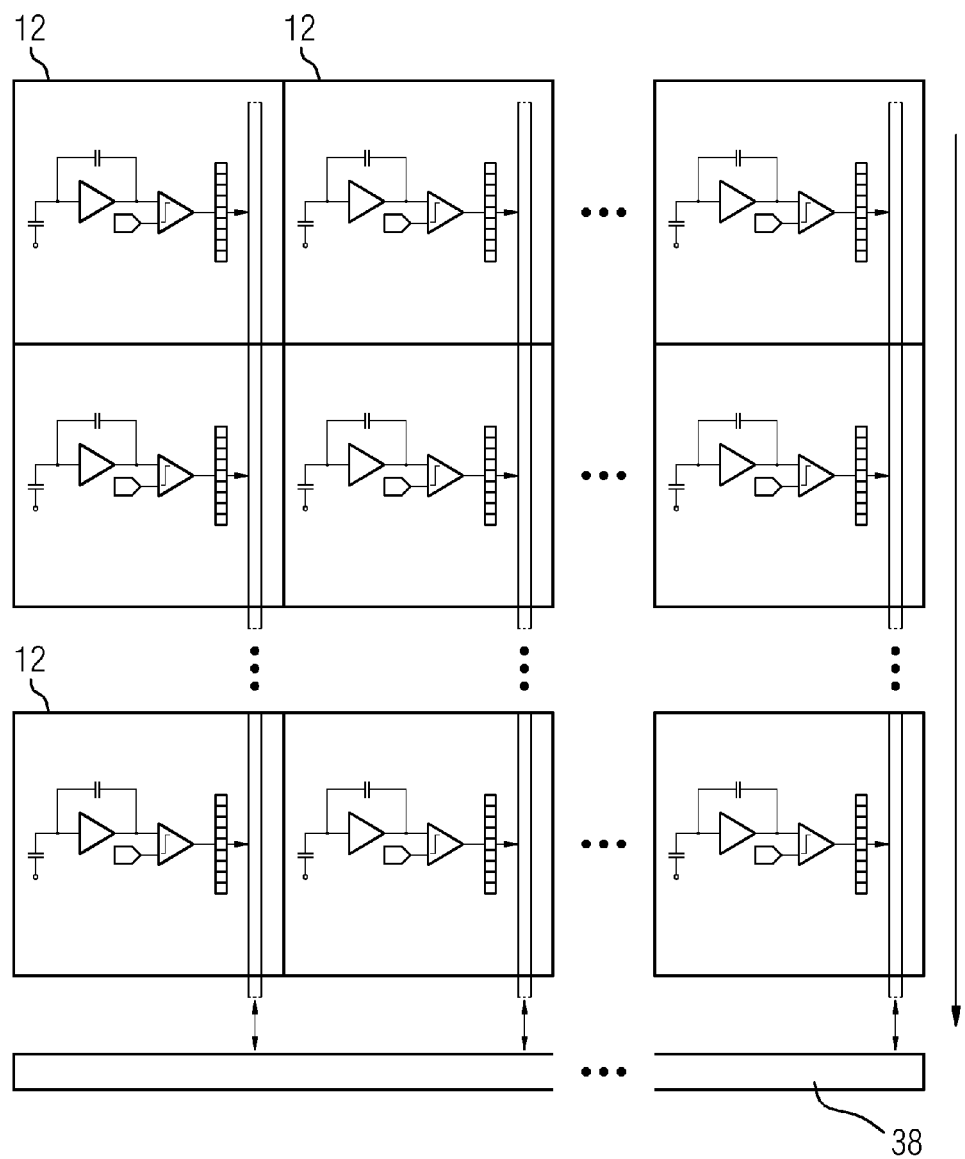
FIG. 6 is a schematic representation of a matrix composed of counting pixel elements of a known X-ray detector having drive and readout logic.
Figure 7:
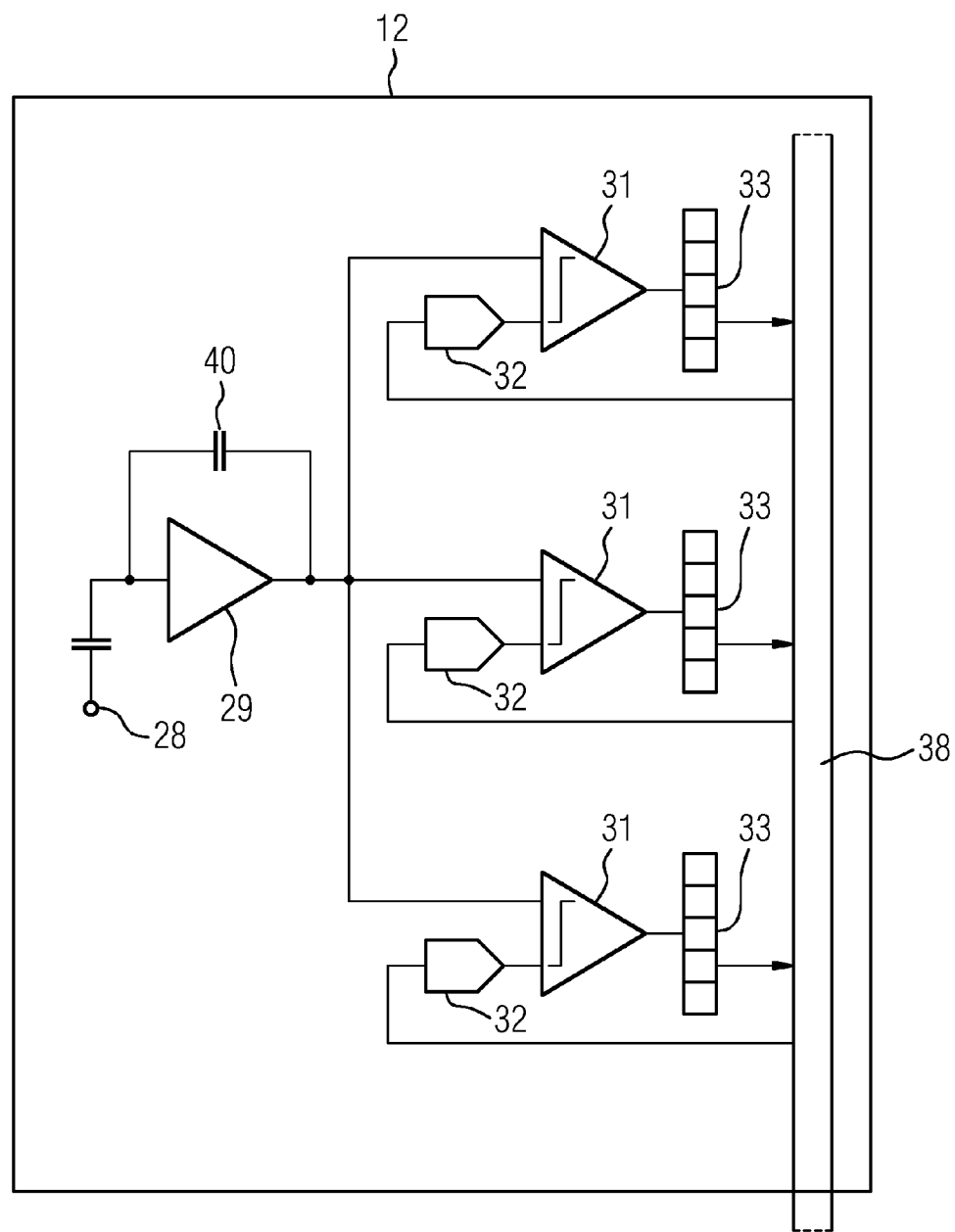
FIG. 7 is a schematic representation of central functional elements of a counting pixel element of a known energy-discriminating X-ray detector.

The present embodiments describe a method for calibrating a digital counting X-ray detector, by which a threshold value noise may be reduced or completely avoided. As a result, the quality of the X-ray imaging is significantly improved. An X-ray detector that may be calibrated by a method of the type has, for example, a structure such as described with reference to FIG. 3, including a direct converter 24 (e.g., CdTe or CZT) for converting X-ray quanta into electrical signals and a plurality of pixel elements in a matrix structure. The plurality of pixel elements may receive and register the signals as count events as a function of position provided the signals lie above a threshold value. The individual pixel elements have central functional elements, as shown, for example, in FIG. 5 (simply discriminating) or FIG. 7 (energy-discriminating). The threshold value that may be applied to the respective pixel element is adjustable.

Discriminators and analog-to-digital converters implemented directly in the respective pixel elements are referred to hereinbelow as local discriminators and local analog-to-digital converters. These provide that a threshold value is applied locally in the pixel element and leads to a signal that exceeds the threshold value being counted by the counter. In addition to the local threshold value for each pixel element individually, a global threshold value that, if applied, is valid for all pixel elements or at least a greater number of pixel elements (e.g., all the pixel elements of a detector module) may in addition or alternatively be applied. A global threshold value is applied, for example, by a global discriminator and global analog-to-digital converter. If both global and local threshold value may be applied or have been applied, the signal in the corresponding pixel element is counted if the summed threshold value is exceeded (e.g., global threshold value gDAC plus local threshold value DDAC; DAC(n,m, Sp)=gDAC+DDAC(n,m,Sp), where n=1 ... N and m=1 ... M denote the position of the pixel element within the matrix). The method is described hereinbelow for a simple discrimination without energy sensitivity. The method may, however, also be easily applied to energy-discriminating X-ray detectors.

Figure 14:
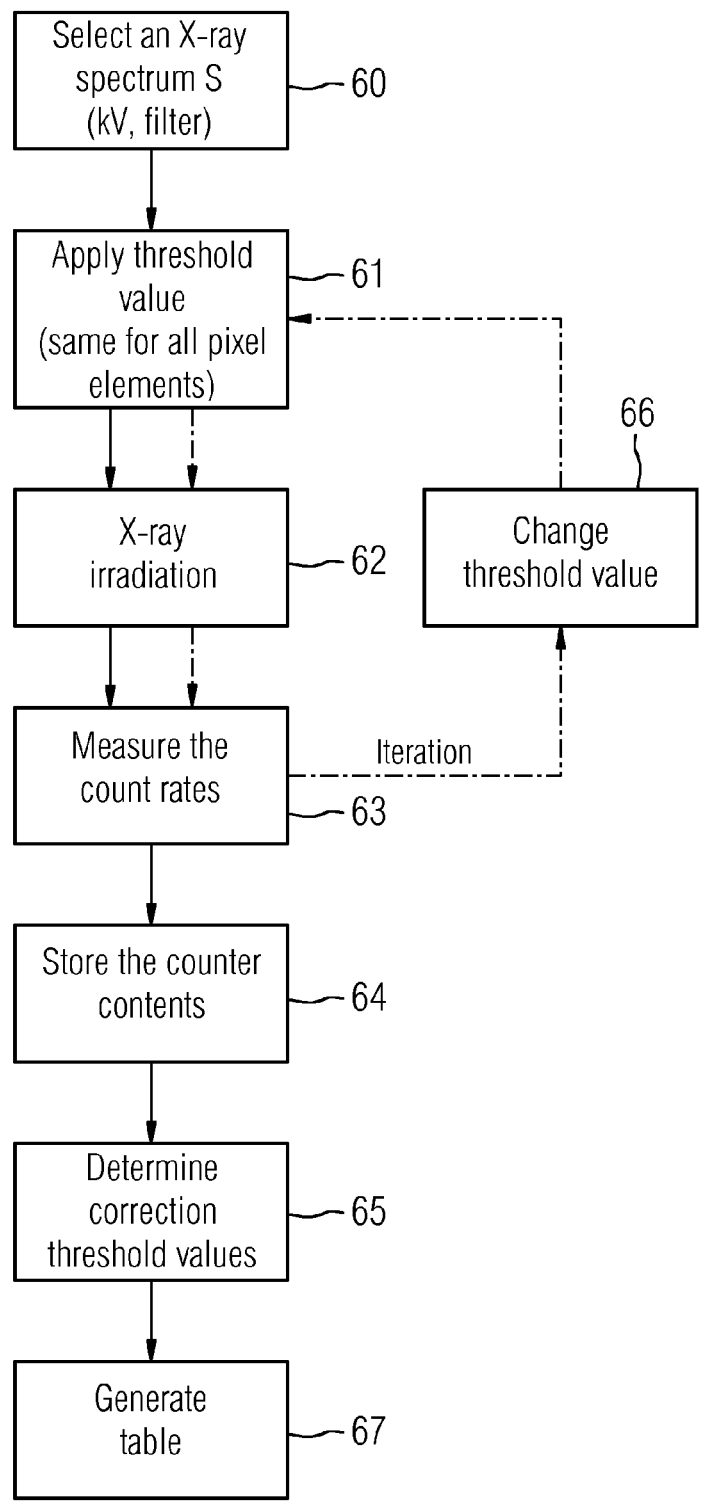
FIG. 14 shows a sequence of one embodiment of a method for calibrating an X-ray detector for an X-ray spectrum.

FIG. 14 shows a sequence of one embodiment of a method. The method may be controlled automatically, for example, by a system controller of an X-ray system, of which the X-ray detector represents one component, or by a separate control unit or by software. In act 60, an X-ray spectrum is initially selected. In this case, for example, an X-ray spectrum $Sp_i$ that may be emitted by a typical X-ray source may be selected (e.g., a maximum of 50, 70, 90 or 120 keV), as well as a typical filtering device. In act 61, a first threshold value that is the same for all pixel elements is applied to all pixel elements of the X-ray detector. For this purpose, an X-ray detector that exclusively includes local discriminators and local digital-to-analog converters is controlled such that the same local threshold value is set and applied for each pixel element by a local discriminator and local digital-to-analog converter. If the X-ray detector also possesses a global discriminator and global digital-to-analog converter or has another way of applying a global threshold value, a global threshold value may be applied by the same to all the pixel elements. The local threshold values may be set to zero. Alternatively, the applied threshold value may also be composed of a portion of global and local threshold value in each case. Initially, the same first threshold value is applied to all of the pixel elements, regardless of in which composition.

In act 62, the X-ray detector is uniformly irradiated with the selected X-ray spectrum and simultaneously, in act 63, the count rates of the pixel elements are measured (e.g., in that the counter contents of the digital memories such as the counters are read out). In act 66, the threshold value that is the same for all pixel elements is changed, and, for example, a second threshold value, likewise the same for all pixel elements, is applied. In other words, act 61 is repeated with a changed threshold value. This may be performed according to the characteristics of the X-ray detector using many identical local threshold values and/or one global threshold value. Similarly, act 62, irradiation with the X-ray spectrum, and act 63, measurement of the count rates, are repeated. If necessary, and depending on application, the loop (iteration), changing the threshold value, applying the new threshold value, irradiation and measurement, may be repeated several times up to as often as desired. A sufficiently high number of measurements using different threshold values is advantageous (e.g., at least five or ten different threshold values), though the same for all pixel elements. All threshold values that are possible using the digital-to-analog converters are applied, for example, in succession in appropriate stages.

In act 64, the respective measurement results are stored (e.g., the count rates as a function of the threshold values). The results may be stored, for example, in a memory unit or an image system. The storage action may also be performed already after each individual measurement.

In act 65, individual correction threshold values for the individual pixel elements are determined or calculated from the stored measurements, for example, by a calculation unit. In this case the correction threshold values are such that when applied to the individual pixel elements in combination with an identical threshold value for all pixel elements for the defined X-ray spectrum, a reduction in the threshold value noise (e.g., in the ideal case, to zero) is brought about. For example, a count starting for all the pixel elements essentially at the same X-ray energy results.

In act 67, the correction threshold values may be stored in a table. Such a table may later be used for acquisitions of X-ray images using the X-ray detector. The stored correction threshold values are retrieved and used for a planned acquisition. If an X-ray image is recorded in this way, the image quality of such an X-ray image is significantly improved because the threshold-value-induced noise has been reduced or completely removed. Thus, the individual correction threshold values may, for example, be used and applied as local threshold values of the individual pixel elements. During the acquisition, for example, a global threshold value is therefore applied to all the pixel elements, and the individual correction threshold values are applied in each case as local threshold values.

Figure 15:
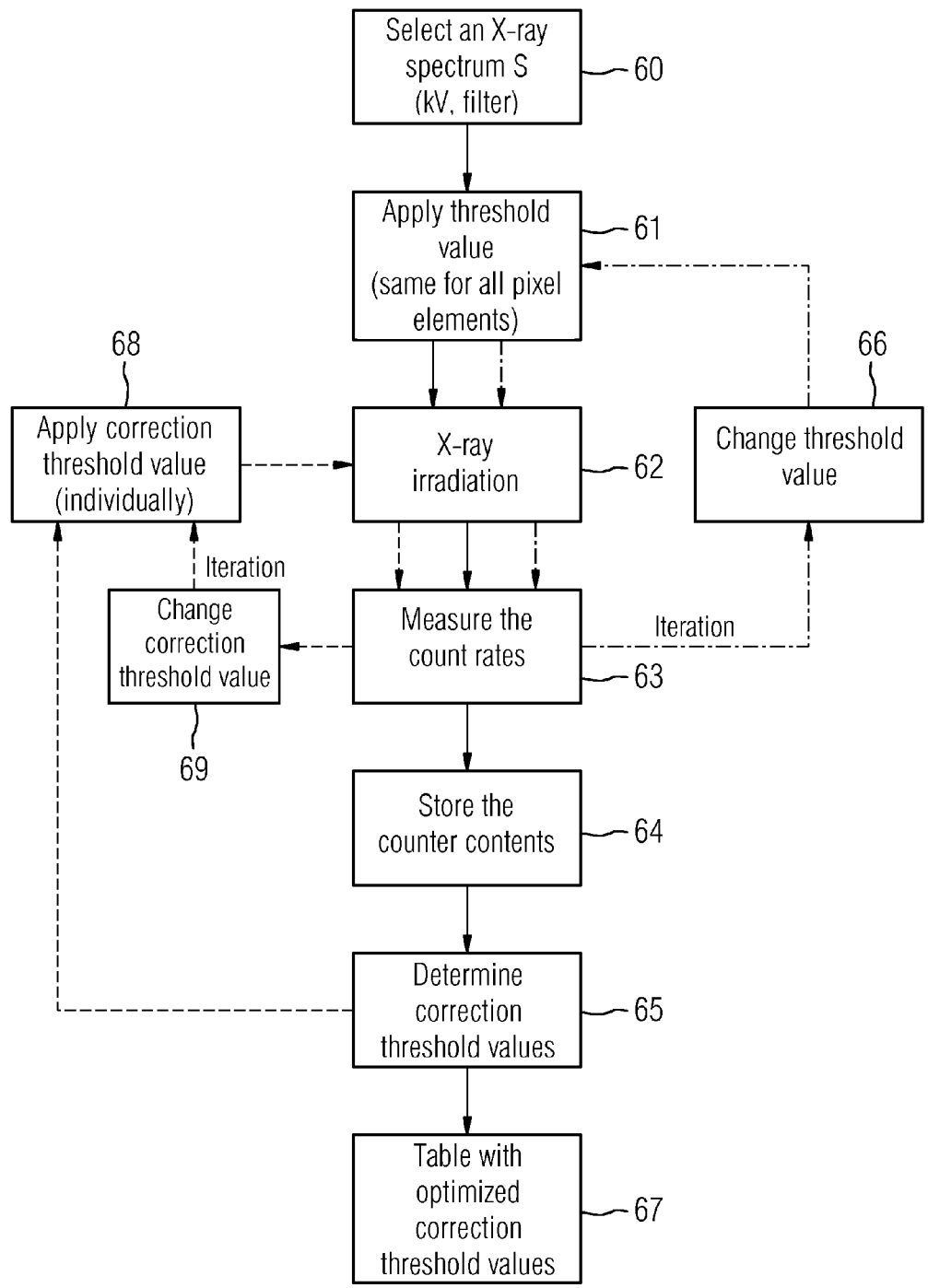
FIG. 15 shows a sequence of an extended, iterated calibration method according to FIG. 14.

The method may be extended even further in order to achieve an even better result. Thus, the method may be repeated, with the difference that instead of the same threshold values for all the pixel elements, the previously determined correction threshold values may be used in addition. Such a modification of the method is shown in FIG. 15. Using the same X-ray spectrum, complementing the same threshold values, the individual correction threshold values are applied in addition to the pixel elements in act 68, and the detector is irradiated with the X-ray radiation, and the count rates are measured, read out and stored. Here too, a plurality of loops (iterations) are performed with changed threshold values in each case (e.g., same global threshold value plus local correction threshold value). The thus obtained measurement results are then used to determine updated correction threshold values that may compensate even better for the threshold value noise. Here too, a plurality of iterations may be performed until, for example, the threshold value noise is completely removed.

Figure 16:
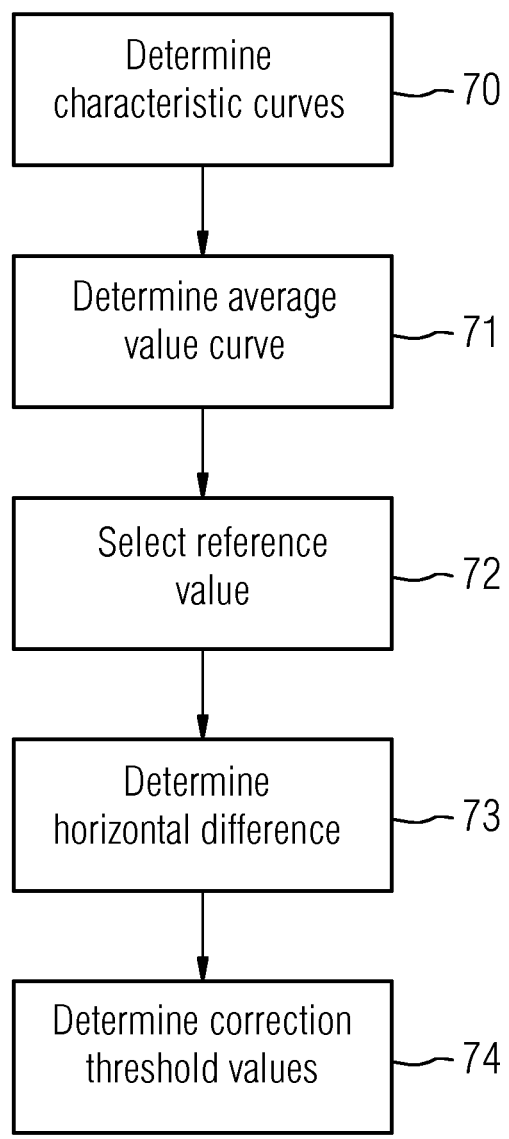
FIG. 16 shows a sequence of one embodiment of a method for calculating correction threshold values.

According to an embodiment, the correction threshold values are determined or calculated with the aid of characteristic curves for the individual pixel elements. The count rate as y-axis is plotted against the threshold value as x-axis. The sequence of the subacts in such a calculation is shown in FIG. 16. In subact 70, characteristic curves for pixel elements are generated from the measured and stored count rates. The count rate Z counted by the counter and read out is plotted against the applied threshold value DAC. FIG. 8 shows such a plot for two pixel elements, with a first unsmoothed characteristic curve a of a first pixel element and a second unsmoothed characteristic curve b of a second pixel element. The characteristic curves may be smoothed for a better result, or a suitable function may be fitted. Scalings may also be performed. For example, for the case where one pixel element has a smaller area than other pixel elements, this may be factored into the count rate.

FIG. 8 shows a first fitted characteristic curve A for the first pixel element and a second fitted characteristic curve B for the second pixel element. In a subact 71, an average value curve is determined or calculated from the characteristic curves of the individual pixel elements (e.g., from a plurality of or all the pixel elements). This may be performed either from the unfitted characteristic curves as unfitted (e.g., unsmoothed/unscaled) average value curve MW or as fitted (e.g., smoothed/scaled) average value curve F. In subact 72, a reference value is selected on the average value curve. Such a reference value MF is shown in FIG. 9. This reference value may be specified at any suitable point on the average value curve (e.g., at 5% or 10% or 20% of the maximum count rate). The threshold value on the average value curve that lies vertically above the point of intersection of the characteristic curve of the pixel element with the lowest count rate may also be used as reference point.

In subact 73, the horizontal difference between the reference value MF and the respective characteristic curve is determined for each pixel element (i.e., the threshold value difference between the average value curve and the respective characteristic curve for the count rate of the reference point). In the example in FIG. 9, the first horizontal difference K(A) is determined for the first pixel element, and the second horizontal difference K(B) (this is negative) is determined for the second pixel element. From the horizontal differences or threshold value differences, the correction threshold values are determined in subact 74. Thus, the correction threshold values may correspond, for example, to the horizontal differences. In this case, however, care must then be taken to provide when using the correction threshold values that no "negative" threshold values may be applied, so that a corresponding conversion is necessary. The correction threshold values may also be determined immediately such that the pixel element with the most negative horizontal difference receives the value zero, and for all others, the amount of the horizontal difference thereof is added to the horizontal differences in order to obtain the correction threshold values.

The characteristic curve with the lowest count rate may also be used directly instead of the average value curve, and a reference point may be selected there. The horizontal differences of the characteristic curves of the other pixel elements are then always positive and may be stored directly as correction threshold values.

Prior to the determination of the horizontal difference (e.g., fourth subact 73), the fitted characteristic curves may also be normalized to one another in a range of high count rates (e.g., 80% or 90% of the count rate of the average value curve; at a threshold value at which 80% or 90% of the X-ray quanta of the X-ray spectrum are counted). Such a plot with a scaling point T is shown in FIG. 10. This may be useful, for example, in order to determine the zero points of the pixel elements (i.e., the threshold value at which the respective pixel elements start to count). A third characteristic curve C of a third pixel element is shown in FIG. 10, where the third pixel element has a smaller surface area than the two other pixel elements but the same zero point as the second pixel element. The scaled curves are also shown (i.e., the first scaled characteristic curve SK(A) of the first pixel element, the second scaled characteristic curve SK(B) of the second pixel element, and the third scaled characteristic curve SK(C) of the third pixel element).

FIG. 11 shows characteristic curves that may be measured after at least one pass through the calibration method has been performed using the correction threshold values for the first and the second pixel element. If, therefore, for example, the respective correction threshold value for the first pixel element is applied locally in the first pixel element, the respective correction threshold value for the second pixel element is applied locally in the second pixel element, and subsequently different threshold values are applied globally in succession, and in this way, measurements are performed under irradiation by the also previously used X-ray spectrum, characteristic curves of the type are the result. An unfitted first characteristic curve a of the first pixel element and an unfitted second characteristic curve of the second pixel element, as well as a fitted average value curve F from the two characteristic curves, are shown. As a result of the use of the correction threshold values, a count at substantially the same X-ray energy starts for both pixel elements. Both pixel elements therefore essentially possess the same zero point, shown by the energy calibration point EE.

The problem that now exists for the calibration method described thus far is that the correction threshold values have a validity with certainty only for the X-ray spectrum at which the method was performed. Accordingly, in order to receive correction threshold values for all possible other X-ray spectra and X-ray energies, such a calibration method would therefore be performed for all possible X-ray spectra. The below-described extension of the method according to one or more of the present embodiments presents one possibility for how correction threshold values for a plurality of X-ray spectra may be determined with little additional overhead. This may be realized by performing acts of the calibration method for a small number of different X-ray spectra and essentially an interpolation.

Figure 17:
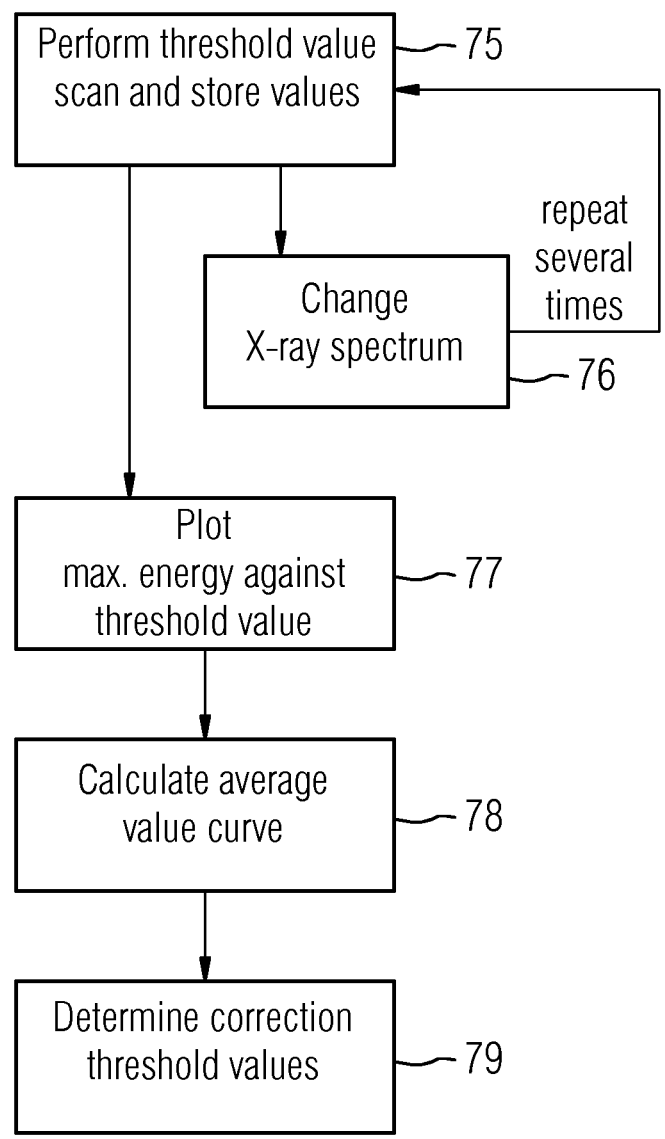
FIG. 17 shows a sequence of an extended method according to one embodiment for calibrating an X-ray detector for a plurality of X-ray spectra.

The main acts of such a method are shown in FIG. 17. Thus, initially, in act 75, a threshold value scan (as described hereintofore) is performed, and the measurement values for a selected X-ray spectrum are stored. Subsequently, in act 76, the X-ray spectrum is changed, and act 75 is repeated for a different X-ray spectrum. This is repeated for at least two (e.g., three or more; four) X-ray spectra. In act 77, characteristic lines for the pixel elements are generated from the measurements for the at least two X-ray spectra by plotting the maximum energy of the X-ray spectra (e.g., 50, 70, 90 or 120 keV) against the threshold value at which the respective pixel element starts to count. The corresponding information may be extracted, for example, from characteristic curves (e.g., plot of the count rate against the threshold values, as described hereintofore).

Figure 12:
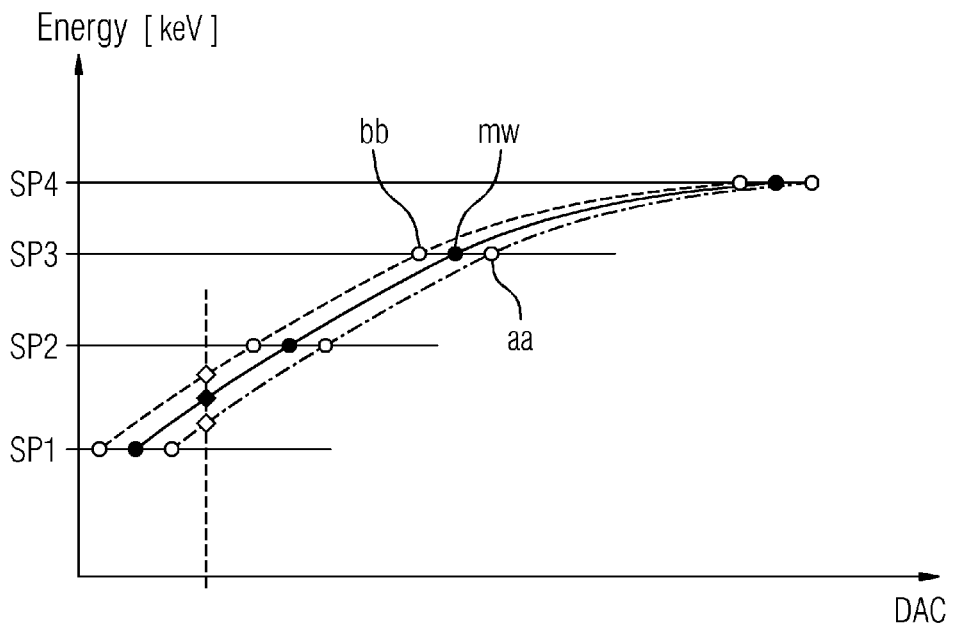
FIG. 12 shows a characteristic line of the energy at which two pixel elements a and b have a count start and an average value characteristic line plotted against the global threshold value prior to use of one embodiment of the calibration method.

Such a plot of the maximum energy of the X-ray spectrum against the start-of-count threshold values is shown in FIG. 12. The corresponding start-of-count threshold values for two pixel elements are plotted against the maximum energy of four different X-ray spectra $SP_1$, $Sp_2$, $Sp_3$ and $Sp_4$, the curve points aa of the first pixel element and the curve points bb of the second pixel element. It is advantageous in this case to generate from the discrete curve points a fit function that represents the characteristic lines. The same fit function (only with values shifted on the x-axis) may be used, for example, for all pixel elements of an X-ray detector. An average value curve mw is determined in act 78 from the (fitted) characteristic lines, as shown in FIG. 12. It is of advantage if the average value curve may be fitted by the same fit function as the characteristic lines of the pixel elements.

Figure 13:
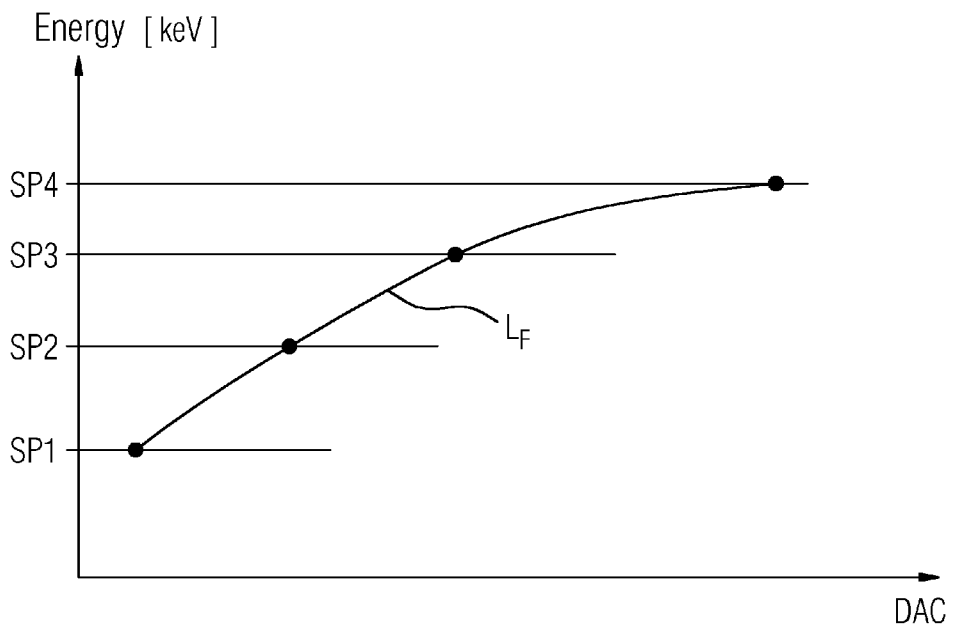
FIG. 13 shows a characteristic line of the energy plotted against the global threshold value after use of one embodiment of the calibration method.

In act 79, the characteristic lines are used for calculating individual correction threshold values for the individual pixel elements. Thus, for example, the correction threshold values may be used directly as horizontal differences between the average value curve and the characteristic lines of the individual pixel elements, or corresponding values derived or calculated therefrom may be used as correction threshold values. Using, for example, an appropriate fit function, correction threshold values for other X-ray spectra at which no threshold value scan was performed may be obtained. Thus, the horizontal difference may be determined from the average value curve for each point of the characteristic lines for the individual pixel elements, since the characteristic lines for points not measured have been interpolated or extrapolated by the fit function. FIG. 13 shows an "ideal" characteristic line $L_F$ that may be achieved after the calibration method has been performed for a plurality of X-ray spectra in the ideal case (i.e., with optimal elimination of the threshold value noise).

Described by way of example hereinbelow is an alternative variant of the method in which the influence of the discriminator threshold values that may be set via digital-to-analog converters is examined initially, and a possible calibration method for aligning the pixel-by-pixel discriminator threshold values with respect to the energy and the correlation of threshold values and energy is performed. The method is described in FIG. 20. It is assumed in the first instance that the architecture provides a global threshold value (abbreviated below as gDAC) and pixel-by-pixel local threshold values (abbreviated below as DDAC(n,m)). The method may, however, be applied analogously if the architecture provides no gDAC, but only a DDAC(n,m) in each case for each pixel element n, m.

A threshold value scan is performed for a given, defined input X-ray spectrum. This is repeated for different X-ray spectra. The threshold value scan is performed, for example, such that starting from the biggest (alternatively from the smallest) selectable threshold value, the count rate is measured in each pixel element. The threshold value is then reduced (or increased), and the method is repeated (e.g., iteration) until the threshold value has arrived at zero (e.g., at the maximum bit value). If the actual threshold values now vary from pixel element to pixel element in spite of the pre-defined threshold value, then one pixel element a will, for example, start to count already, whereas another (e.g., pixel element b) will not start yet, but only when the applied threshold value is reduced further (see also FIG. 8, which shows the count rate plotted against the applied threshold value). If the applied threshold values are gradually reduced further, the pixel element a already sees a greater part of the X-ray spectrum and therefore already counts more X-ray quanta at this threshold value than, for example, the pixel element b. The count rate for each pixel element is subject to quantum statistics (e.g., dependent on the selected dose or, as the case may be, the quantum flux) and therefore fluctuates from threshold value to threshold value. If an average is taken over all the pixel elements of a detector module or of the entire X-ray detector (e.g., including a plurality of detector modules), then the statistics become considerably better, and an average count rate curve (e.g., average value curve MW) is produced as a function of the threshold value. For the very first threshold value scan for a certain X-ray spectrum $Sp_i$ (e.g., defined by at least the tube voltage in kVp, whereby the maximum X-ray energy of the X-ray quanta is given in keV, and the prefiltering), each pixel element is initially allocated the same threshold value. This may be described as follows: DAC(n, m,S)=gDAC+DDAC(n,m,S), where DDAC(n,m,S)=0 for all n=1 . . . N and m=1 . . . M, where gDAC is the global threshold value, and DDAC(n,m,S) is the local threshold value (e.g., and the current pixel-by-pixel threshold value difference or correction table for each pixel n, m).

The aim is to align the threshold values for each pixel element by adapting the threshold value difference table such that in a repeated threshold value scan, all the pixel elements start to count essentially at the same global threshold value gDAC. The pixel-by-pixel threshold values DDAC may be adapted, for example, as follows (see FIG. 9 and FIG. 10): The average value curve (e.g., of one detector module or of all detector modules) is smoothed (e.g., already considerably fewer statistical variations are produced as a result of the averaging), and a suitable function is fitted. The smoothed average value curve or fitted function is fitted to the threshold value scan curves of each individual pixel element, where degrees of freedom such as shifting of the curve on the x-axis, scaling and similar are permitted. An average reference value is specified. The reference value may be specified at any suitable point. This may be beneficial, for example, at 10% or 20% of the maximum count rate. It is, however, also possible to directly select the threshold value lying closest to the point at which the fitted count rate curve touches or meets the x-axis over the average value curve. The more gain differences (e.g., due to different pixel sizes at detector module limits compared to the center of the detector module) from pixel element to pixel element play a role, the more suitable it may be to use a comparatively small percentage count value (e.g., 5% or even the zero point of the fitted function) as reference value, since in these cases, even after the pixel-by-pixel threshold value correction, the characteristic curves of different pixel elements scale differently on the y-axis (e.g., a pixel element with a smaller surface area will count less than a pixel element of greater surface area). Alternatively or in addition, the fit curves in a range of high count rate (e.g., for a threshold value for which already a large part such as 80% of all the X-ray quanta of the X-ray spectrum are counted) normalize to one another (e.g., scaling point), since any pixel-by-pixel threshold value differences play no role. If the zero point (e.g., the threshold value at which or before which the counter starts to count) is selected as reference value, this leads to no improvement. If the zero point may only be determined imprecisely for the individual pixel elements, then this may be useful in addition. FIG. 10 shows a third pixel element c that absorbs fewer X-ray quanta (e.g., due to a smaller surface area than the first and second pixel element a or b) and therefore also counts less. The third pixel elements c does, however, possess, for example, the same threshold value shift as the second pixel element b. The scaling of the fitted count rate curves of the pixel elements to a scaling point has hardly any influence on the pixel-by-pixel correction threshold values as long as the selected reference point is small enough (e.g., referred to the maximum count rate), and the selected scaling point is large enough (e.g., referred to the maximum count rate). The iterative correction threshold value determination process also helps in this regard.

The horizontal difference dgDAC(n,m,S) between the average reference value and the corresponding value on the curve or fitted function of the pixel element (e.g., in gDAC values) is determined for each pixel element n,m. An updated DAC difference or correction table, DDAC(n,m,S), is generated from the differences determined in that way. If different increments are used for the global DAC and the pixel-by-pixel DDACs (e.g., 2 keV/bit for the gDAC and 0.5 keV for the DDACs), then a corresponding conversion factor k (e.g., 4) is to be taken into account. In other words, it holds that:

$$DDACs(n,m,S)=k*dgDAC(n,m,S).$$

If the gDAC or/and the pixel-by-pixel DDACs exhibit a non-linear behavior, then it may further be taken into account that the conversion factor is not a constant k, but a more complex function that may be specified, for example, as follows:

$$DDACs(n,m,S)=k(gDAC,dgDAC(n,m,S))* dgDAC(n,m,S).$$

The threshold value scan is repeated again with the updated correction table (DDAC(n,m,S)). This procedure may be iterated multiple times if necessary. In the ideal case, the count rates become aligned with one another, and as of a given global threshold value gDAC, all the pixel elements start to count (see FIG. 11).

In addition, a link between X-ray energy and threshold value may also be established. After the above-described iteration has been performed, and the pixel elements n,m have been corrected to the pixel-by-pixel correction threshold value, DDAC(n,m,S), in the ideal case, all the pixel elements start to count at the same global threshold value, gDAC (e.g., it is assumed the scan is started at high global threshold values). This global threshold value then corresponds approximately to the maximum energy of the X-ray spectrum. An X-ray spectrum is generated with a tube voltage of, for example, 70 kVp (e.g., at 70 keV). If the above-described method is therefore performed for different X-ray spectra, $Sp_i$, at different kVp (e.g., 50, 70, 90, 120 kVp), then a gDAC-keV characteristic line curve, gDAC(keV), may be produced, as shown in FIG. 13, by, for example, generating a suitable function (e.g., linear, higher-order polynomial, root characteristic or similar; whatever the properties of material, preamplifier, threshold values, discriminators, etc. dictate) to the measured points (e.g., by a fit method). Under certain conditions (as shown in FIG. 13), the characteristic line may be non-linear.

FIG. 12 shows the relationship without prior pixel-by-pixel DAC correction (e.g., for the case DDAC(n,m,$Sp_i$)=0 or else after an insufficiently large number of iteration steps). The endpoint energies of an X-ray spectrum for different pixels may under certain conditions lie at different global threshold values. Conversely, different energies correspond to different pixel elements for one threshold value (see lozenges). Continuous pixel-by-pixel correction threshold values, DDAC(n,m,keV), may be extracted by fitting a suitable function to the discrete pixel-by-pixel correction threshold values, DDAC(n,m,$Sp_i$). In this connection, for a desired discriminator threshold in keV, the corresponding global threshold value, gDAC(keV), and the required pixel-by-pixel correction threshold values, DDAC(n,m,keV), may be specified, and the same may be loaded into the X-ray detector in order to be used for the acquisition of X-ray images. If the pixel design makes provision for a plurality of discriminator thresholds (e.g., in the case of energy discrimination), then a correspondingly large number of gDAC(keV) values and corresponding correction threshold values, DDAC(n,m,keV), are loaded.

The acts in the alternative variant of the method are described in FIG. 20. Depending on implementation, the calculation of improved (e.g., updated) correction threshold values may happen externally (e.g., in an external PC or in suitable external image processing electronics; then the Z(n,m,gDAC,$Sp_i$) are read out into the PC, processed there, new DAC correction tables are generated and are loaded into the detector again), or the calculation may also be performed, for example, in an FPGA or other computing units directly in the peripheral electronics of the detector (e.g., internally).

The threshold values may be discrete (e.g., whole numbers) and correspond to certain energy steps of, for example, 0.5, 1, 2 or more keV per bit (e.g., dependent on embodiment). However, because the fit functions calculate "real" non-discrete correction threshold values dgDAC(n,m,S), the nearest threshold value or the next smaller or next larger correction threshold value, DDACs(n,m,S), for example, may be selected to allow easier implementation.

As described hereinabove, a similar calibration method may also be applied to X-ray detectors having no global threshold value gDAC. In this case, the local threshold values are then set such that the individual (e.g., pixel-by-pixel) count rate curves coincide as well as possible with the averaged or fitted count rate curve. It is possible to iterate here too. At any rate, new measurements may be dispensed with. Instead, the iterative determination of the averaged and fitted count rate curve and the required shifting of the individual local threshold values and scaling to a common scaling point are recalculated.

X-ray sources in the form of the X-ray tubes available on X-ray systems may be used in order to perform the calibration method. This has the advantage that all the preconditions for calibration are present on a conventional X-ray system, and a recalibration may be performed again at any time without great effort. The radiation may, however, also be generated by monochromatic sources. Then, however, the characteristic curves of the count rates have somewhat different profiles from those shown in FIGS. 8 to 11. With commercially available X-ray sources, the integral count rate may increase as threshold values become smaller, since the X-ray spectrum is wide. With monochromatic sources, the count rate may increase very rapidly when the threshold value (e.g., coming from high values) reaches the value corresponding to the X-ray energy, and not increase further as soon as the threshold value falls significantly below this (e.g., inverted S curves). Suitable radioactive sources such as, for example, $^{60}$Co, $^{137}$Cs, $^{241}$Am may be used as monochromatic sources, or quasi-monochromatic sources that exploit the Bragg reflection may be used.

In addition to the calibration or correction of the threshold-value-induced noise, a gain calibration of X-ray images may be performed. It may be important to distinguish threshold-value-induced count rate influences from other "gain-like" influences (e.g., geometry). For example, both a higher threshold value and a smaller pixel size may lead to a lower count rate than for a comparable pixel element. Once the correction threshold values for the pixel elements for different energies have been found, then a gain calibration known from currently used integrating detectors may subsequently take place in order to compensate for multiplicative differences from pixel element to pixel element with a corresponding correction. Suitable gain correction maps, G(n,m), are generated. The correction of a "count rate image" Z(n,m,keV) that has been produced above a threshold value keV is corrected, for example, according to the following scheme: $Z_{corr}$(n,m,keV)=Z(n,m,keV)*Gain(n,m). In addition, defective pixel elements are identified and stored in corresponding defect maps, D(n,m). A defective pixel element is corrected in that an expected signal is reconstructed by the information from adjacent, non-defective pixel elements (e.g., by averaging, interpolation, etc.) and assigned to the defective pixel element.

Different gain calibration data may be determined and used for different X-ray spectra. It may be advantageous also to generate gain maps, Gain(n,m,keV), analogously to the generation of X-ray-spectrum-dependent pixel-by-pixel correction threshold values. For that purpose, corresponding gain maps, G(n,m,Sp), may be generated for a plurality of sampling points (i.e., a plurality of X-ray spectra $Sp_i$). Depending on necessity and implementation, the gain map, G(n,m,Sp), that is most suitable may be used for the gain correction of a count rate image, Z(n,m,keV). This may be further refined such that yet more gain maps G(n,m,keV) are produced (e.g., by interpolation or extrapolation with the aid of the acquired gain maps, G(n,m,S)).

Figure 18:
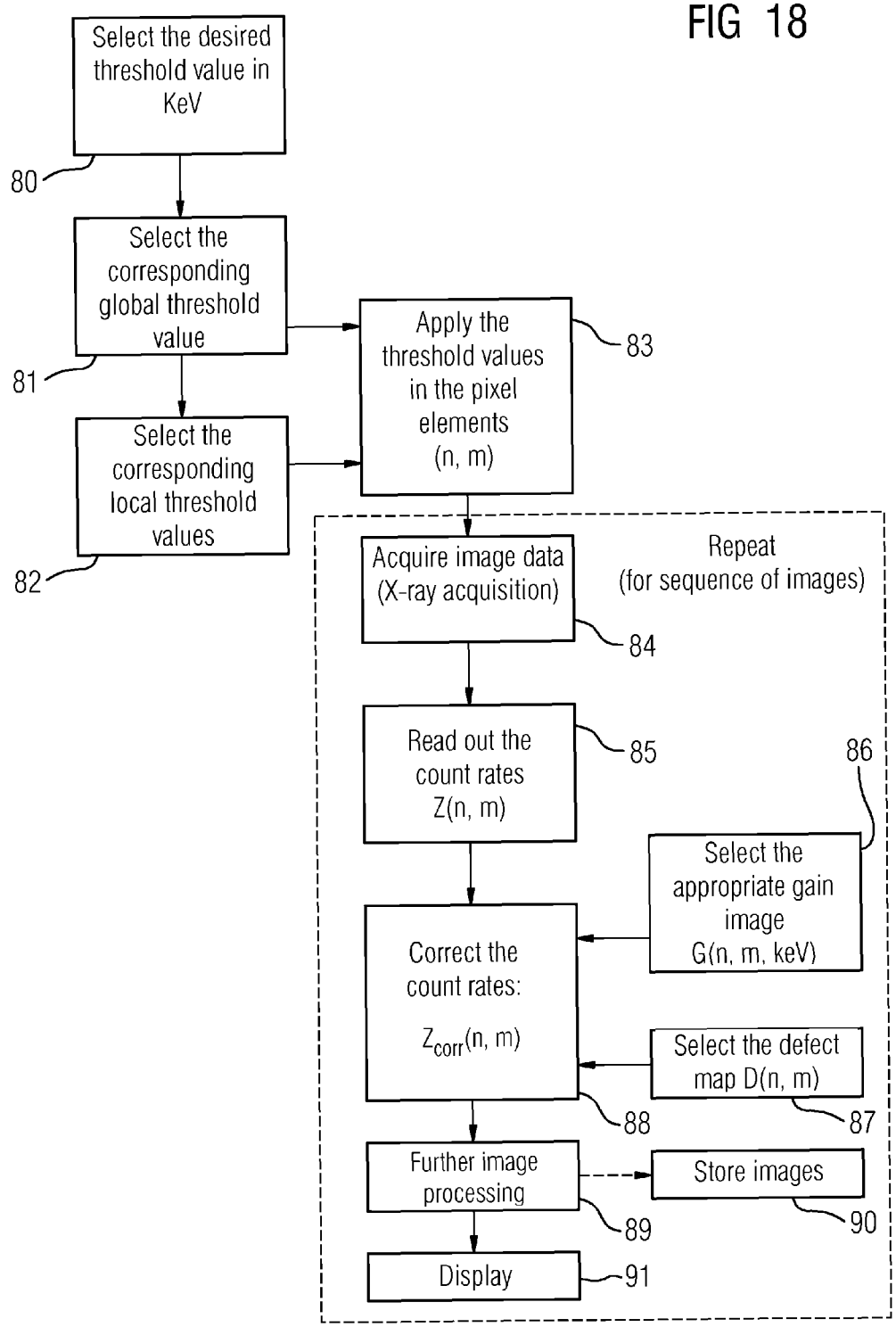
FIG. 18 shows a sequence of one embodiment of an acquisition and image processing of an X-ray image using a correspondingly calibrated X-ray detector.
Figure 19:
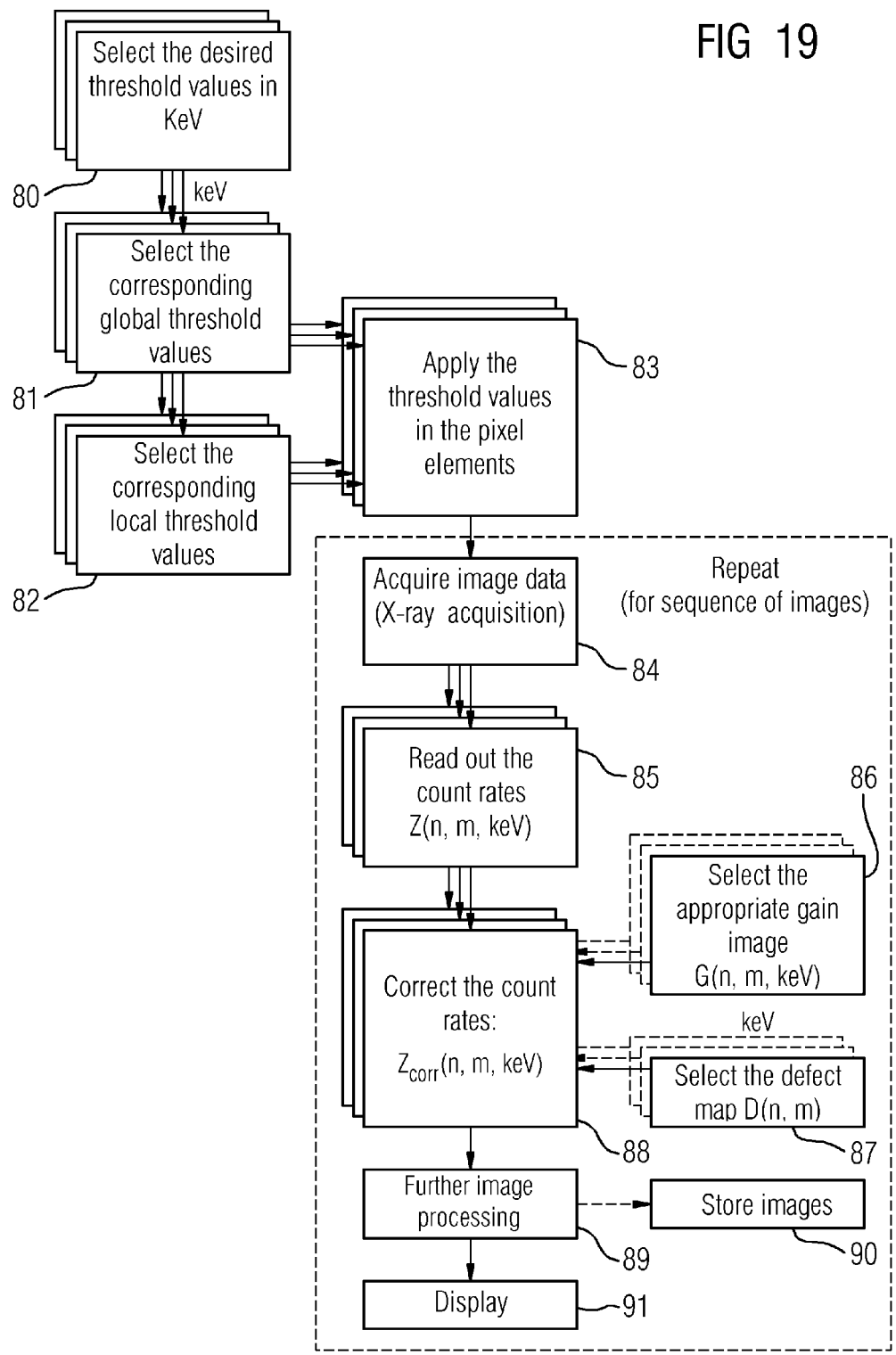
FIG. 19 shows a sequence of one embodiment of an acquisition and image processing of a plurality of X-ray images using a correspondingly calibrated X-ray detector.

FIGS. 18 and 19 show exemplary sequences of methods for acquiring X-ray images using correction threshold values obtained from the method according to one or more of the present embodiments. An X-ray detector having pixel elements each having a counter is provided in FIG. 18, and an energy discrimination device (e.g., counting in a plurality of energy stages) is provided in FIG. 19. For energy discrimination, an X-ray detector with pixel elements that have a plurality of counters as well as a plurality of local discriminators and local digital-to-analog converters is used, as shown, for example, in FIG. 7.

In act 80, the overall threshold value or, in the case of energy discrimination, the desired overall threshold values that is/are to be applied to the pixel elements is/are selected.

In act 81 and act 82, which global threshold value and which local threshold values are to be used in order to convert the overall threshold value are derived therefrom. In this way, as described hereintofore, the correction threshold value determined for the corresponding X-ray spectrum to be used may be applied locally, and the remaining portion is applied globally. In any case, the correction threshold values determined in the calibration method according to one or more of the present embodiments are resorted to. In act 83, the corresponding threshold values are applied (e.g., globally and locally). In an act 84, image data of an examination object is acquired while the examination object is being irradiated by the X-ray spectrum, and the count rates are read out in act 85. In act 86, the appropriate gain image is selected, and in act 87, the appropriate defect map for correction is selected. In act 88, these are used to perform the corrections of the previously read-out count rates. Further image processing 89 may also take place, and the processed X-ray images may be supplied to a storage facility 90 and to a display 91 (e.g., for presentation on a monitor).

The workflow may only be regarded as schematic, since, for example, a plurality of readout processes of the count rates may take place per visualized X-ray image in order for these "readings" then to be composed into an image, and typically a repetition of image acquisitions is not initiated only when the image is displayed on the monitor. The use of more than one gain and/or defect map is shown as an option.

Using the calibration method according to one or more of the present embodiments, a significant improvement in image quality and a reduction in threshold-value-induced noise may be achieved. A direct assignment of threshold values to the energy of the X-ray quanta (e.g., important for energy-selective imaging; i.e., determining threshold value energy characteristic lines) is achieved. The method is very simple and robust and may be performed using simple, known X-ray sources, without monoenergetic (e.g., radioactive) X-ray sources. The method may be easily automated, thus enabling a recalibration to be completed quickly in the event of drifts, temperature factors, etc.

One or more of the present embodiments may also be applied to X-ray detectors having energy discrimination or to X-ray detectors having window discriminators (e.g., lower and upper threshold value). One or more of the present embodiments provide a method for calibrating a counting digital X-ray detector including an X-ray converter for converting X-ray radiation into an electrical signal and a matrix composed of a plurality of counting pixel elements. Each pixel element has a signal input and at least one memory unit (e.g., a counter). For each pixel element, a threshold value above which the incoming signal is counted by a memory unit is applied. The method includes performing a threshold value scan in a defined X-ray spectrum for irradiating the X-ray detector. The performing of the threshold value scan includes applying a first threshold value that is the same for all pixel elements, irradiating the X-ray detector with X-ray radiation of the defined X-ray spectrum, and during the irradiation, measuring the count rates of the pixel elements of the X-ray detector. The performing of the threshold value scan also includes subsequently applying a further threshold value, different from the first threshold value, to all the pixel elements. The performing of the threshold value scan includes repeating the irradiating and the measuring. The performing of the threshold value scan also includes, if necessary, one-time or multiple iteration of the applying of the further threshold value. The method includes storing count rates of the pixel elements as a function of the respective applied threshold values, and from the measurement results, determining or calculating individual correction threshold values for the individual pixel elements. The individual correction threshold values correct a threshold value that is to be applied to the pixel elements for the defined X-ray spectrum such that the threshold value noise is reduced (e.g., a count starting essentially at the same X-ray energy for all of the pixel elements being effected).

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for calibrating a counting digital X-ray detector comprising an X-ray converter for converting X-ray radiation into an electrical signal and a matrix composed of a plurality of counting pixel elements, wherein each pixel element of the plurality of counting pixel elements has a signal input and at least one memory unit, and wherein for each pixel element of the plurality of counting pixel elements, a threshold value above which the incoming signal is counted by a memory unit is appliable, the method comprising:

performing a threshold value scan in a defined X-ray spectrum for irradiating the X-ray detector, the performing comprising:
applying a first threshold value that is the same for all pixel elements of the plurality of counting pixel elements;
irradiating the X-ray detector with X-ray radiation of the defined X-ray spectrum;
measuring, during the irradiation, count rates of the plurality of counting pixel elements of the X-ray detector; and
subsequently applying a further threshold value to all pixel elements of the plurality of counting pixel elements and repeating the irradiating and the measuring, wherein the further threshold value is different than the first threshold value;
storing the count rates of the plurality of counting pixel elements as a function of the respective applied threshold values; and
determining or calculating, from the measurement results, individual correction threshold values for individual pixel elements of the plurality of counting pixel elements, the individual correction threshold values correcting a threshold value that is to be applied to the plurality of counting pixel elements for the defined X-ray spectrum such that a threshold value noise is reduced.

2. The method of claim 1, wherein each pixel element of the plurality of counting pixel elements has at least one local discriminator and one local digital-to-analog converter by which a threshold value is applied to the pixel element.

3. The method of claim 1, wherein the X-ray detector has at least one global discriminator and one global digital-to-analog converter for applying a global threshold value to all or more than one pixel element of the plurality of counting pixel elements,
wherein each pixel element has at least one local discriminator and one local digital-to-analog converter for applying a local threshold value to the respective pixel element, and the threshold value is appliable to a pixel element as the sum of the global and the local threshold value, and
wherein in the threshold value scans, the local threshold values are set to zero.

4. The method of claim 3, wherein the performing, the storing, and the determining or calculating are repeated,
wherein the individual correction threshold values are used in the threshold value scans in addition to the threshold values that are the same for all pixel elements of the plurality of counting pixel elements, and
wherein thereby updated correction threshold values are determined in the determining or calculating.

5. The method of claim 4, wherein the method is iterated multiple times, the individual, current correction threshold values determined in a preceding iteration being used in each case in the threshold value scans.

6. The method of claim 4, wherein the correction threshold values are applied as local threshold values to the individual pixel elements.

7. The method of claim 6, wherein during the determination or calculation of the correction threshold values, different increments of the global and local digital-to-analog converters, non-linear behavior of the global and local digital-to-analog converters with respect to one another, or a combination thereof is taken into account through use of conversion factors.

8. The method of claim 1, wherein the determining or calculating of the individual correction threshold values comprises:
determining characteristic curves for individual pixel elements of the plurality of counting pixel elements by plotting the count rates against the threshold value;
calculating an average value curve from the characteristic curves of the pixel elements;
selecting a reference value on the average value curve;
determining a horizontal difference between the reference value and the respective characteristic curve of the pixel elements; and
determining the correction threshold values from the horizontal differences.

9. The method of claim 8, wherein the characteristic curves are fitted, smoothed, scaled, or a combination thereof.

10. The method of claim 8, wherein the reference value is selected between 5% and 25% of a maximum count rate.

11. The method of claim 8, wherein the performing of the threshold value scan and the storing of the count rates are performed for at least two different X-ray spectra, and
wherein the method further comprises:
generating characteristic lines for the plurality of counting pixel elements from the measurements for the at least two X-ray spectra by plotting a maximum energy of the X-ray spectra against the threshold value at which the respective pixel element starts to count;
determining an average value curve from the characteristic curves of the plurality of counting pixel elements; and
using the characteristic lines for the determining or calculating of the individual correction threshold values for the individual pixel elements, correction threshold values being determined for different X-ray spectra or X-ray energies.

12. The method of claim 11, wherein correction threshold values for X-ray energies at which no threshold value scan is present are determined by an interpolation or extrapolation method.

13. The method of claim 1, further comprising generating and storing a table from the correction threshold values,
wherein the correction threshold values are extractable from the table as necessary and used for the plurality of counting pixel elements of the X-ray detector.

14. The method of claim 1, wherein the method is performed automatically.

15. The method of claim 1, wherein for the case where only discrete values are selectable for the threshold values and the determined correction threshold values deviate from the selectable discrete values, the discrete values closest to the correction threshold values are used in each case.

16. The method of claim 1, further comprising performing one or more iterations of applying a further threshold value.

17. The method of claim 1, wherein the individual correction threshold values correct a threshold value that is to be applied to the plurality of counting pixel elements for the defined X-ray spectrum such that a count starting essentially at the same X-ray energy for all of the pixel elements is effected.

18. A method for acquiring at least one X-ray image using an X-ray system comprising a counting digital X-ray detector, an X-ray source operable for emitting X-ray radiation, a memory unit operable for storing count rates of a plurality of counting pixel elements, and a calculation unit configured for determining or calculating correction values, wherein the counting digital X-ray detector comprises an X-ray converter operable for converting X-ray radiation into an electrical signal, a matrix composed of the plurality of counting pixel elements, a drive and readout unit, and at least one global discriminator and one global digital-to-analog converter having an adjustable global threshold value that is appliable to all or more than one pixel element of the plurality of counting pixel elements, wherein each pixel element of the plurality of counting pixel elements has a signal input, a counter and at least one local discriminator and one local digital-to-analog converter having an individually adjustable local threshold value for the respective pixel element, and wherein for each pixel element of the plurality of counting pixel elements above a summed threshold value, an incoming signal is counted by a memory unit, the method comprising:
calibrating the counting digital X-ray detector, the calibrating comprising:
performing a threshold value scan in a defined X-ray spectrum for irradiating the X-ray detector, the performing comprising:
applying a first threshold value that is the same for all pixel elements of the plurality of counting pixel elements;
irradiating the X-ray detector with X-ray radiation of the defined X-ray spectrum;
measuring, during the irradiation, count rates of the plurality of counting pixel elements of the X-ray detector;
subsequently applying a further threshold value to all pixel elements of the plurality of counting pixel elements and repeating the irradiating and the measuring, wherein the further threshold value is different than the first threshold value;

storing the count rates of the plurality of counting pixel elements as a function of the respective applied threshold values; and determining or calculating, from the measurement results, individual correction threshold values for individual pixel elements of the plurality of counting pixel elements, the individual correction threshold values correcting a threshold value that is to be applied to the plurality of counting pixel elements for the defined X-ray spectrum such that a threshold value noise is reduced; and using the correction threshold values determined during the acquisition of the X-ray image for the purpose of correcting the threshold value noise.

* * * * *